United States Patent [19]

Best

[11] 4,305,131
[45] Dec. 8, 1981

[54] DIALOG BETWEEN TV MOVIES AND HUMAN VIEWERS

[76] Inventor: Robert M. Best, 16016 9th N.E., Seattle, Wash. 98155

[21] Appl. No.: 136,100

[22] Filed: Mar. 31, 1980

Related U.S. Application Data

[63] Continuation of Ser. No. 9,533, Feb. 5, 1979, abandoned.

[51] Int. Cl.³ .................. G11B 31/00; G06F 15/44; G10L 1/00
[52] U.S. Cl. .......................... 364/521; 179/1 SM; 340/725; 352/5; 358/102; 358/903; 364/410; 434/323; 367/198
[58] Field of Search ............... 364/415, 521, 419, 410; 340/148, 725; 35/8 A, 9 A, 35 C; 358/93, 102, 903; 352/5; 360/72.2; 179/1 SA, 1 SM, 1 CN

[56] References Cited

U.S. PATENT DOCUMENTS

| | | | |
|---|---|---|---|
| 3,601,530 | 8/1971 | Edson | 179/1 CN |
| 3,662,374 | 5/1972 | Harrison et al. | 352/5 |
| 3,721,757 | 3/1973 | Ettlinger | 360/72.2 |
| 3,747,087 | 7/1973 | Harrison et al. | 358/93 X |
| 3,778,058 | 12/1973 | Rausch | 340/725 X |
| 3,825,674 | 7/1974 | Justice | 35/9 A X |
| 3,878,560 | 4/1975 | Ramage | 35/35 C |
| 3,883,850 | 5/1975 | Martin et al. | 179/1 SA X |
| 3,939,579 | 2/1976 | Andrews et al. | 35/9 A |
| 3,943,295 | 3/1976 | Martin | 179/1 SA |
| 3,946,157 | 3/1976 | Dreyfus | 179/1 SA |
| 3,960,380 | 6/1976 | Yokoi | 273/311 |
| 3,974,482 | 8/1976 | Balashov et al. | 35/9 A X |
| 3,987,484 | 10/1976 | Bosche et al. | 35/9 A X |
| 4,016,540 | 4/1977 | Hyatt | 179/1 SM |
| 4,059,841 | 11/1977 | Bricot et al. | 358/128 |
| 4,060,915 | 12/1977 | Conway | 35/9 A |
| 4,075,620 | 2/1978 | Passavant et al. | 364/521 X |
| 4,116,444 | 9/1978 | Mayer et al. | 364/521 X |
| 4,130,881 | 12/1978 | Haessler et al. | 364/415 X |
| 4,210,785 | 7/1980 | Huber | 360/72.2 X |

OTHER PUBLICATIONS

Bagley et al: Method for Computer Animation of Lip Movements, IBM Technical Disclosure Bulletin, vol. 14, No. 10, pp. 3039, 3040, Mar. 1972.
Cavanagh: Educational/Institutional Features of the Optical Videodisc System, Journal of the SMPTE, vol. 86, Apr. 1977, pp. 201–203.
Wells: Random Selection and Branching in the Motion–Picture Audio Visual Field, Journal of the SMPTE, Nov. 1970, vol. 79, 983/990.
Suppes: The Use of Computers in Education Scientific American, vol. 215, Sep. 1966, pp. 207/220.
Kenney: Special Purpose Applications of the Optical Video–Disc System, IEEE Transactions on Consumer Electronics, Nov. 1976, pp. 327–338.

*Primary Examiner*—Felix D. Gruber
*Attorney, Agent, or Firm*—Graybeal & Uhlir

[57] ABSTRACT

A video amusement system by which one or more viewers influence the course of a motion picture as if each viewer were a participant in a real-life drama or dialog. A speech-recognition unit recognizes a few spoken words such as "yes" and "run" spoken by a viewer at branch points in the movie, thus simulating a dialog between the screen actors and the viewer. The apparatus may read an optical videodisc containing independently addressable video frames, blocks of compressed audio, and/or animated cartoon graphics for the multiple story lines which the movie may take. A record retrieval circuit reads blocks of binary-coded control information comprising a branching structure of digital points specifying the frame sequence for each story line. A dispatcher circuit assembles a schedule of cueing commands specifying precisely which video frames, cartoon frames, and portions of audio are to be presented at which instant of time. A cueing circuit executes these commands by generating precisely timed video and audio signals, so that a motion picture with lip-synchronized sound is presented to the viewer. Recordings of the viewers' names may be inserted into the dialog so that the actors speak to each viewer using the viewer's own name. The apparatus can thus provide each viewer with an illusion of individualized and active participation in the motion picture.

49 Claims, 21 Drawing Figures

DIALOG BETWEEN TV MOVIES AND HUMAN VIEWERS

This is a continuation of U.S. patent application Ser. No. 009,533, filed Feb. 5, 1979 now abandoned.

BACKGROUND OF THE INVENTION

1. Field of the Invention

The apparatus and methods of this invention relate to the following classes: voice controlled television, electric amusement devices, motion picture and sound synchronizing, videodisc retrieval, digital generating of animated cartoons, and branching motion pictures.

2. Description of the Prior Art

Since the beginning of the motion picture industry, movies have generally been constrained to a predetermined sequence of predetermined scenes. Although a vicarious sense of involvement is often felt by each viewer, the immutability of the sequence of scenes limits the viewer's actual participation to a few primative options such as cheering, commenting, and selecting what to watch. This limitation in prior-art movies has not changed substantially with the advent of television, video games, and audience-response systems.

Although the prior art includes devices capable of providing viewer participation, such devices do not provide all of the following features in one entertainment medium:

(1) vivid motion picture imagery;
(2) lip-synchronized sound;
(3) story lines (plots) which branch (have alternative sequences);
(4) elaborately developed story lines as in motion picture drama;
(5) scene changes responsive to inputs from each individual viewer;
(6) seamless transitions between shots;
(7) many hours of non-repetitive entertainment.

Furthermore no prior art device can conduct a voice dialog with each viewer in which the screen actors respond to the viewer's voice in a natural conversational manner.

Prior-art video game devices enable players to control video images via buttons, knobs, and control sticks. But in these devices the images are limited to one stereotyped scene such as a battlefield, an automobile race, a gun fight, or a surface on which a ball is moved around. Such game devices generate simple moving figures on a television screen, but the elaborate plot, dialog, characterization, and most of the cinematic art is absent.

Another problem faced by the present invention is providing many hours of interactive entertainment without obvious repetition. Prior-art video games can be played for many hours only because they involve ritualistic cycles in their mechanism of play. Such cycles lack the variety, suspense, and realism of conventional movies.

The use of microcomputer-controlled videodiscs for interactive instruction has been discussed in the literature (for instance see "Special Purpose Applications of the Optical Videodisc System", by George C. Kenney, IEEE Transactions on Consumer Electronics, November 1976, pages 327-338). Such computer-assisted instructional devices present conventional movie portions and still frames with narration in response to information entered by the student via push-buttons. But this prior art does not teach how to synchronize multiple alternative motion picture sequences with multiple alternative audio tracks so that spoken words from any of the audio tracks are realistically synchronized with the moving lips of the human actors in the video image. Nor does the prior art teach a method for automatically inserting spoken names of the players into a prerecorded spoken dialog so that lip-synchronization (lip-sync) is maintained. Nor does the prior art teach a method for making a television movie responsive to spoken words from the viewers/players so that an illusion of personal viewer participation results.

Prior art systems for recognizing voice inputs and generating voice responses, such as described in U.S. Pat. No. 4,016,540, do not present a motion picture and therefore cannot simulate a face-to-face conversation.

Prior art voice controlled systems such as described in U.S. Pat. No. 3,601,530, provide control of transmitted TV images of live people, but cannot provide a dialog with pre-recorded images.

Prior-art systems have been used with educational television in which the apparatus switches between two or more channels or picture quadrants depending on the student's answers to questions. Such systems cannot provide the rapid response, precise timing, and smooth transitions which the present invention achieves, because the multi-channel broadcast proceeds in a rigid sequence regardless of the student's choices.

The prior art also includes two-way "participatory television" which enables each subscriber of a cable-TV system to communicate via push-buttons with the broadcaster's central computer so that statistics may be gathered on the aggregate responses of the viewers to broadcast questions and performances. Similar systems use telephone lines to communicate viewer's preferences to the broadcaster's computer. Although the central computer can record each viewer's response, it is not possible for the computer to customize the subsequent picture and sound for every individual viewer. The individual's response is averaged with the responses from many other subscribers. Although such systems permit each person to participate, the participation is not "individualized" in the sense used herein, because the system cannot give each individual a response that is adapted to him alone.

The prior art for synchronizing audio with motion pictures is largely concerned with film and video tape editing. Such devices as described in U.S. Pat. No. 3,721,757, are based on the presumption that most of the editing decisions as to which frames will be synchronized with which portions of the audio have been made prior to the "final cut" or broadcast. If multiple audio tracks are to be mixed and synchronized with a motion picture, such editing typically takes many hours more than the show itself. It is not humanly possible to make the editing decisions for frame-by-frame finecut editing and precise lip-sync dubbing, during the show. For this reason, prior-art editing and synchronizing apparatus (whether preprogrammed or not) cannot provide each individual player with an individualized dialog and story line, and are therefore not suitable for interactive participatory movies and simulated voice conversations which are automatically edited and synchronized by the apparatus during the show.

Another problem not addressed in the prior art is the automatic selection of a portion of audio (from several alternative portions) which may be automatically inserted into predetermined points in the audio signal by the apparatus during the show. For example, the insertion of the names of the players, selected from a catalog of thousands of common names, into a dialog so that the actors not only respond to the players but call them by name. Recording a separate audio track for each of the thousands of names would require an impractically large amount of disc space. But using a catalog of names requires that each name be inserted in several points in the dialog, whenever an actor speaks the name of the then current player. The task of synchronizing audio insertion so that the dialog flows smoothly without gaps or broken rhythm at the splice is one heretofore performed by skilled editors who know in advance of the editing procedure which frames and audio tracks are to be assembled and mixed. In the present apparatus this finecut editing cannot be done until after the show has started, because no human editor can know in advance the name of each player and the sequence of the dialog which will change from performance to performance. The present invention solves these editing and synchronizing problems.

While watching a prior art branching movie as described in U.S. Pat. No. 3,960,380, a viewer cannot talk with the screen actors and have them reply responsively. Applying prior art speech-recognition techniques to control such branching movies would not provide a realistic conversational dialog because of the following problem: If the number of words which a viewer of any age and sex can speak and be understood by the apparatus is sufficiently large to permit a realistic conversation, then prior art speech-recognition techniques are unreliable. But, if the vocabulary is restricted to only a few words to make speech recognition reliable, then a realistic conversation would not result. This problem is resolved in the present invention.

SUMMARY OF THE INVENTION

This invention provides a form of entertainment heretofore not provided by any prior-art system. With this invention one or more people can participate in a motion picture by steering it in a direction of their own choosing and with the consequences of their participation explicitly performed by motion picture images and voices of actors or cartoon characters. Users of the system can carry on simulated conversations with the screen actors who may address each player by the player's own name. The invention enables television viewers to participate in simulated conversations with famous people, and choose the direction the conversation takes as it progresses. The invention eliminates the need for the ritualistic cycles characteristic of prior-art games, by permitting each show to be significantly different from any recent show. This is accomplished by a special-purpose microcomputer which may automatically schedule and control presentation of video frames, and/or digitally-generated animated cartoons, and digitized audio which is automatically lip-synced with the motion picture.

Some embodiments of the invention include voice-recognition circuitry so that the course of the movie can be influenced by words or other sounds spoken by each viewer to produce an illusion of individualized participation.

Some embodiments include processing of branching schedules of control commands which specify precise sequences and timing of video, audio, and graphics to provide a lip-synchronized movie having a seamless flow through alternative story lines.

Some embodiments include synchronizing multiple video frames and/or animated cartoon frames with alternative audio portions during the show, such as inserted names of the players/viewers, while preserving lip-sync and seamless flow.

This invention comprises various apparatus and methods for performing the functions or combination of functions which may provide individualized participation in a motion picture and simulated conversations with people. Some of these functions may in some embodiments be performed by microprocessors executing programs which may be fixed as firmware incorporated into the same semiconductor chips as the conventional processing circuits. These programmed microprocessors are in essence special-purpose circuits. Microprocessors executing separately-stored programs may also be used.

The claims appended hereto should be consulted for a complete definition of the invention which is summarized in part in the present summary.

GENERAL DESCRIPTION OF THE INVENTION

Figure 1:
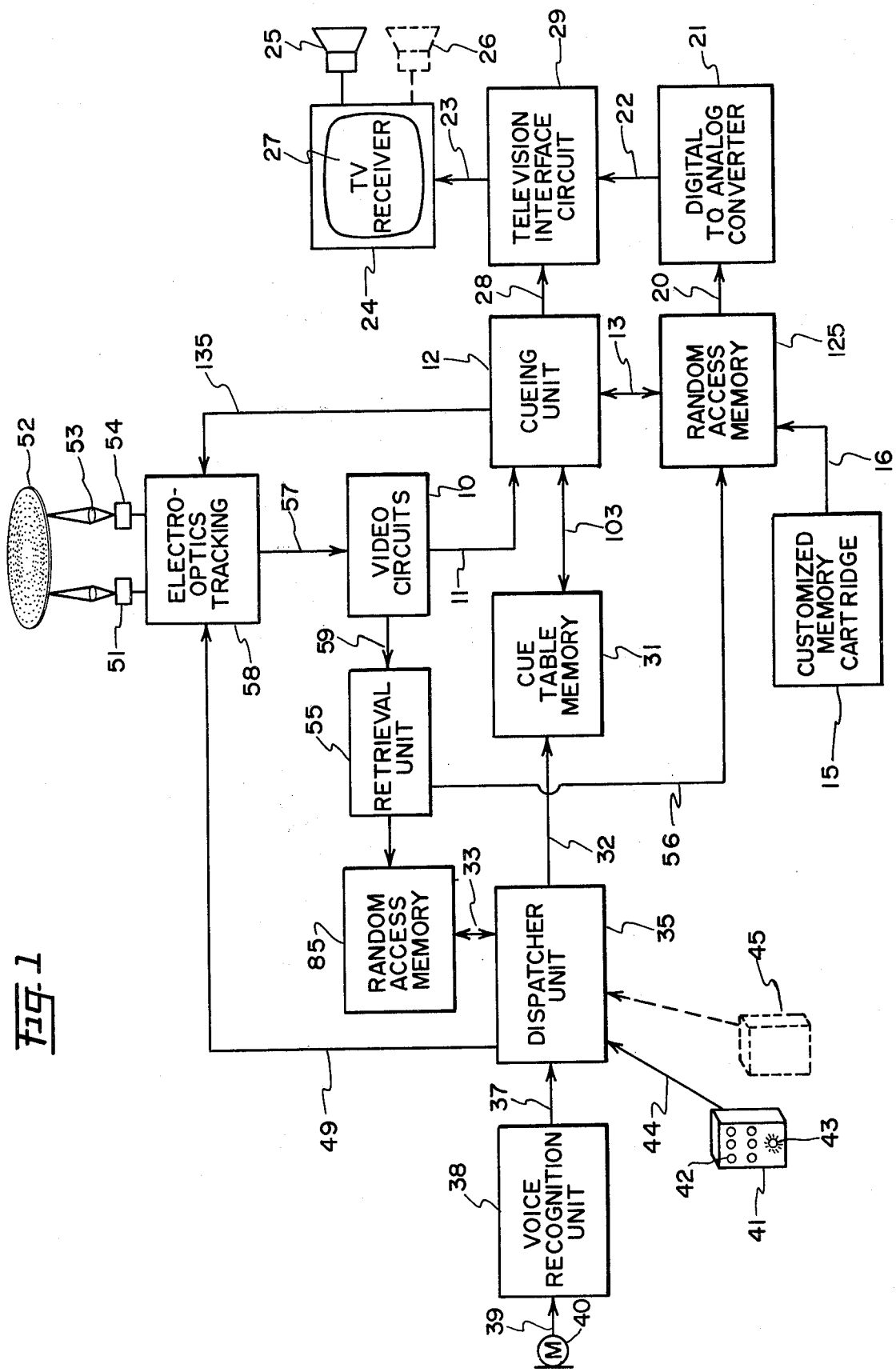
FIG. 1 is a schematic block diagram showing one embodiment of the invention using a videodisc and videodisc reader.

In one embodiment of the invention, a special-purpose microcomputer selects video frames and portions of audio for reading from a videodisc and for presenting as a motion picture with synchronized sound. The sequence in which the video and audio are read from the disc is controlled by a complex schedule of control commands which specify which frames are to be selected in which sequence, at what time and for how long. This schedule is continually changed as the movie proceeds. When each viewer/player makes a choice at a branch point (or choice point) in the movie, a new set of commands is read from the disc and scheduled for execution. These control commands are of two kinds: story commands and cue commands. These are explained in detail below.

The ritualistic cycles which characterize prior-art video games may be avoided in three ways: by using different audio each time the video frames are repeated, by obscuring any unavoidable repetition by complex structures of alternative story lines, and by using digitally generated animated cartoons which may be stored in compressed form in a fraction of the disc space that video frames require. In each show a different story line is selected by the apparatus and the players. Alternative story lines may use many of the same video frames or cartoon figures, but with different audio and in different sequences so that the repetition is not noticable to the players.

In a case scene the same roadway or forest or stairs can be used again and again provided care is taken to avoid recognizable "landmarks" except where needed for indicating the closeness of the pursuer. The main problem in such multiple use of video frames is the accurate timing needed to produce a smooth seamless flow, and the problem of synchronizing voice and sound effects with the recycled video, so that the cycling and dubbing are not noticable to the viewers/players.

If animated cartoons are used instead of camera-originated video frames, and if the cartoons are digitally generated during the movie, the limited amount of digital data that can be stored on a videodisc may be expanded to dozens of times as many hours of unrepeated video than is possible with camera-originated video. This reduces the need for repetition of shots and scenes. However, the problem remains of providing a smooth seamless flow through multiple story lines while maintaining sync between voice sound and talking cartoon characters and non-dialog sync sound.

Dozens of hours of audio can be recorded on a videodisc using prior-art time-compression circuitry during recording and time-expansion during playback. Compressed audio has been used in the prior art for narration which accompanies frozen video frames (still frames) used in interactive education. However, if the picture is moving rather than still and if it requires synchronizing with the audio, then a much more difficult timing problem results. This problem is solved by the present invention by automatically editing the audio and video tracks as they are playing, and precisely positioning them in time according to a prerecorded schedule which is continually updated as the show proceeds and alternative branches in the movie are chosen.

Figure 2:
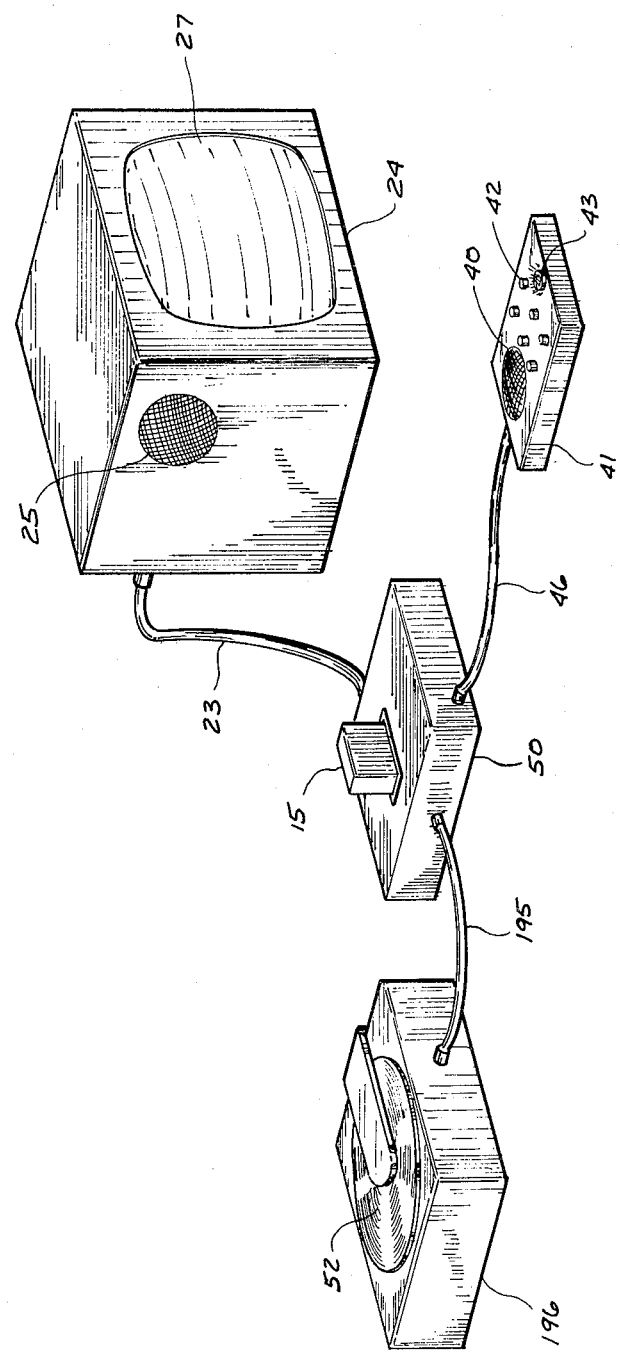
FIG. 2 is a pictorial view of a special-purpose microcomputer coupled to a television receiver and to a videodisc reader.

Referring to FIG. 2, in one embodiment of this invention special-purpose microcomputer 50 (which may include blocks 35, 55, 12 and other blocks shown in FIG. 1) may be electronically connected via cable 23 to a conventional television receiver 24 and via cable 195 to a conventional random-access videodisc reader 196 which includes automatic track-address seeking and track-following circuitry (block 58 in FIG. 1). One or more hand-held input units 41, each containing a small number of push buttons 42 or proximity-sensitive touch pads 42 and a microphone 40, are also electronically connected to microcomputer 50 via cable 46 or via wireless transmission (using transceiver 171 in FIG. 12). Microcomputer 50 controls the reading of information from record-carrier videodisc 52 and processes the player's inputs from push buttons 42 and/or microphone 40. Cartridge 15 containing digitized recordings of the player's names may plug into microcomputer 50. Microcomputer 50 and/or videodisc reader 196 and/or picture screen 27 may be assembled in one or more enclosures and in various arrangements.

Figure 12:
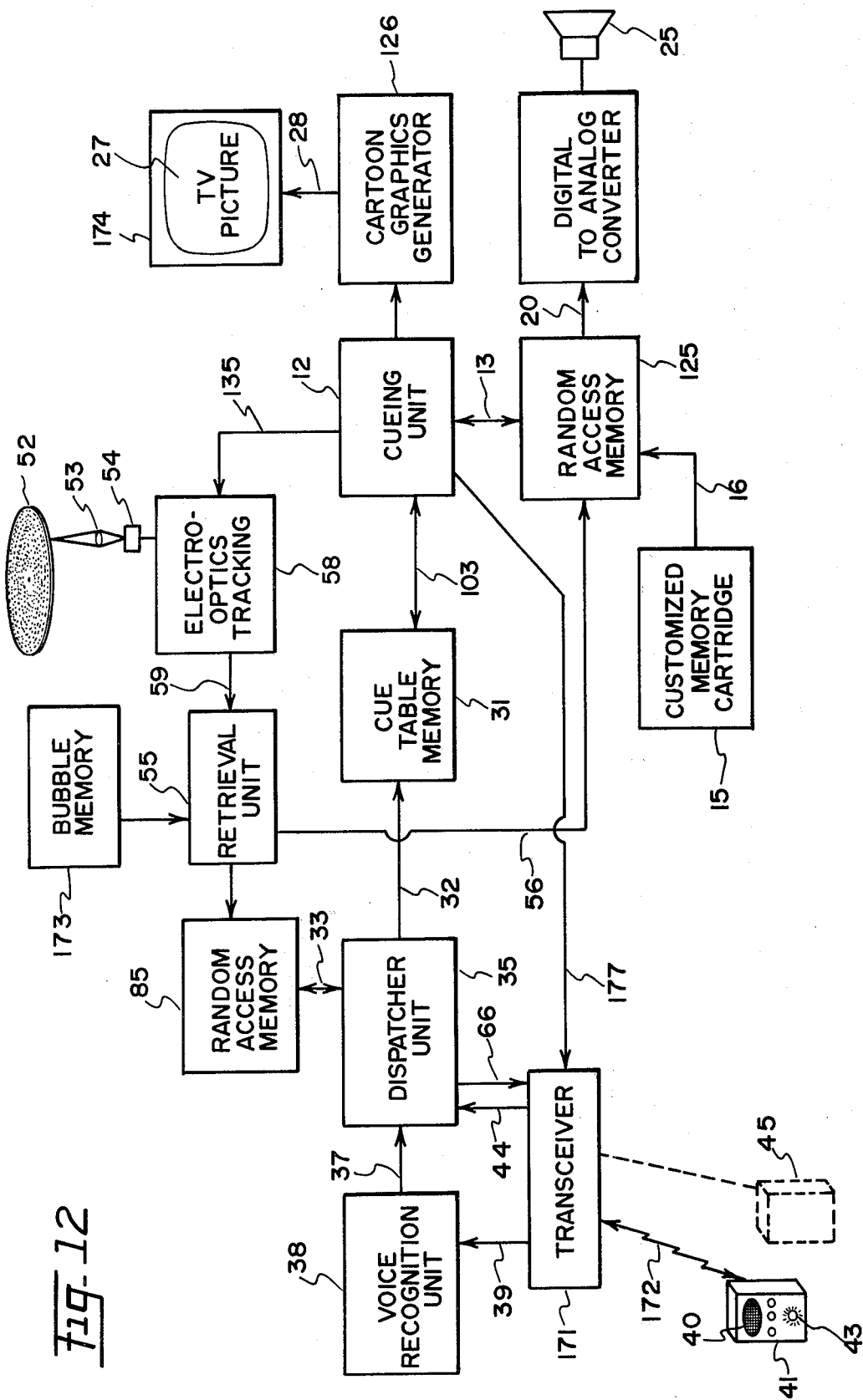
FIG. 12 is a schematic block diagram showing one embodiment of the invention using digitized generation of animated cartoons.
Figure 19:
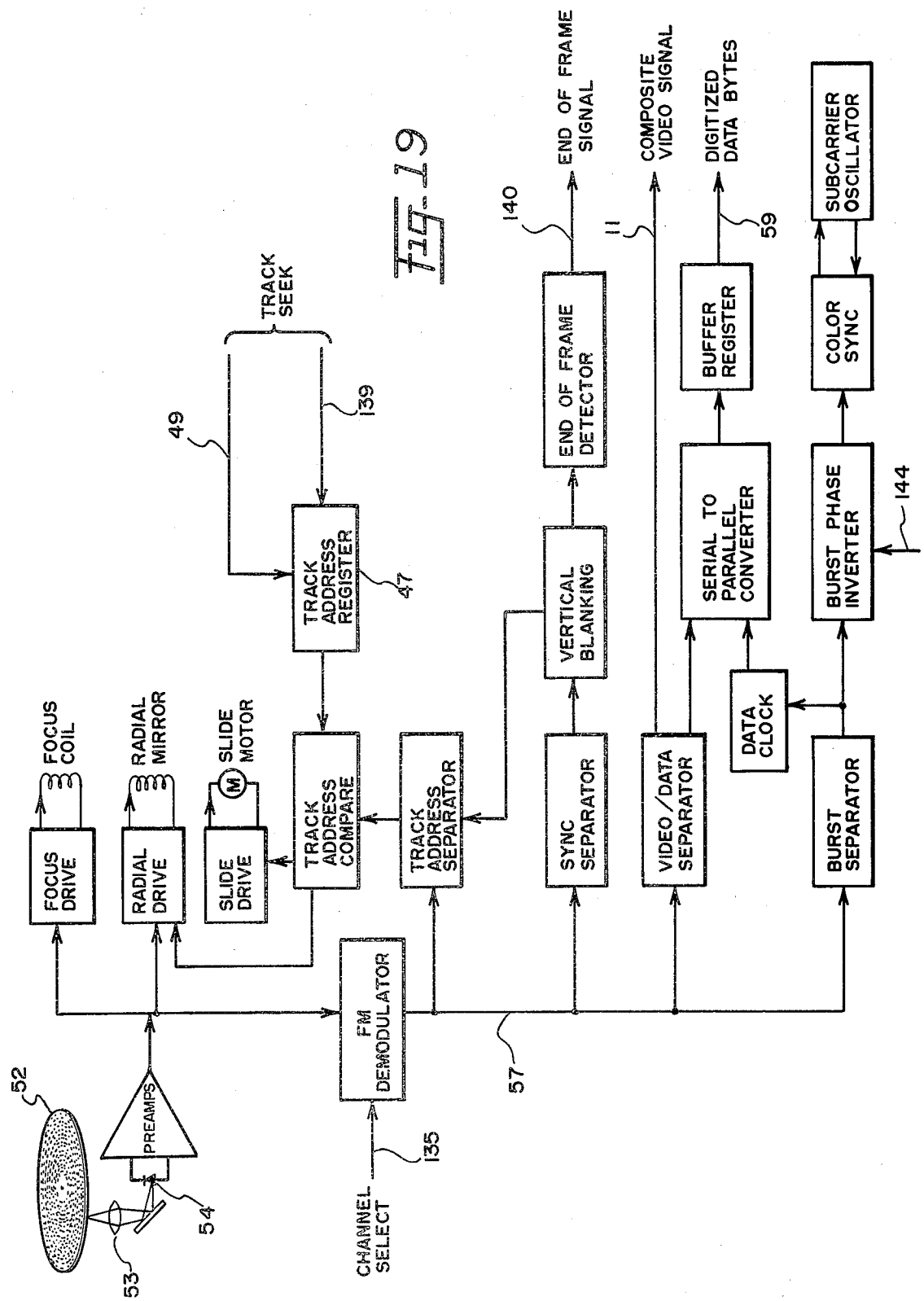
FIG. 19 is a block diagram of prior-art electro-optical device 58 and video process circuits 10 which may be used with some embodiments of the invention.

Microcomputer 50 in FIG. 2 may consist of several subunits shown in FIG. 1 and FIG. 12. These subunits may include: speech/voice recognition unit 38, dispatcher unit 35, retrieval unit 55, and cueing unit 12. The microcomputer also contains conventional random access memories 34, 85 and 125, digital/analog converter (DAC) 21 to generate audio signal 22, conventional RF-modulator interface circuit 29 to interface with the television receiver 24, and prior-art video process circuits 10 (detailed in FIG. 19) for vertical/horizontal sync separation, demodulation, burst separation and phase invertion. TV-interface circuit 29 may be eliminated if video 28 and audio 22 lines are connected directly to unit 24 circuits as indicated in FIG. 12.

Unit 58 may be one or more conventional videodisc tracking units, such as the one described in U.S. Pat. No. 4,059,841, or other bulk memory devices which have random access capability, such as magnetic disc readers and/or magnetic bubble memory (173 in FIG. 12). For embodiments of this invention in which animated cartoons and/or other graphics are generated internally, but in which camera-originated video is not required, then magnetic bubble or other solid-state memory may provide sufficient bit capacity. But in embodiments requiring camera-originated video for realism or a large number of different cartoon frames, a videodisc reader is preferred which uses one or more optical read heads for tracking and reading selected tracks on videodisc 52 with a beam of laser light focused by lens 53. Each read head may be used to read video, digitized audio, animation data, or digitized control information, depending on which track is addressed. Two optical read heads 51 and 54 and 2-channel circuitry in block 58 are preferred for reading camera-originated video frames so that one read head 54 can be moving to the next position on the disc while the other read head 51 is reading the current video frames or vice versa. A single head with multi-channel sensors may also be used. In economy models, a single-channel reader may be used, but this may result in occasional (preplanned) gaps in the video signal as the head skips over unused (for the current show) tracks, or while it is reading audio or control information. Vertical and horizontal sync should be maintained curing such gaps. One channel is sufficient for embodiments using digitally generated animated cartoons in lieu of camera-originated video. Only one channel is shown in FIG. 1 and in the other drawings.

The demodulated signals for video frames, digitized audio, and other digitized information pass from tracking circuit 58 to circuit 10 on line 57. The composite video signal passes through circuit 10, cueing unit 12 and interface circuit 29 to TV receiver 24. Digitized audio passes from video circuit 10 through retrieval unit 55, memory 125, D/A converter 21, and interface circuit 29 to TV receiver 24. The control commands pass from circuit 10 through retrieval unit 55, memory 85, dispatcher 35, memory 31, to cueing unit 12.

Retrieval unit 55 is a conventional peripheral input controller which stores into memory the digitally coded blocks of information obtained from videodisc 52. This information includes control data (commands) which unit 55 stores into memory 85 (and memory 86 in FIG. 3) for use by dispatcher unit 35, and compressed audio and/or graphics data which unit 55 stores into memory 125 via line 56 for use by cueing unit 12. The control data includes cue commands and story commands. Cue commands specify what is to happen during an interval of time. Story commands represent points in time, and form chains which define each alternative story line. Some of the cue commands may specify ordered sequences of video frames, cartoon pictures, and/or other graphics data. Other cue commands may specify audio data in memory 125 for converting to sound presented with the picture. The story commands may consist of digital pointers which form complex networks (illustrated in FIG. 5) that tie groups of the cue commands together into ordered schedules of cue commands. At branch points in the network of story commands two or more story commands may point to alternative chains or branching structures of story commands representing alternative sequences in the movie.

After retrieval unit 55 has read and stored the information blocks into memory, control of the read head may be released by dispatcher unit 35 to cueing unit 12 which may position it for the next series of video frames. Thus the two read heads 51 and 54 may alternate in reading video and information blocks so that there is no interruption in the picture on screen 27. Memories 85, 86 and 125 may be different portions of a common memory, but are shown separately in the drawings for clarity.

Figure 9:
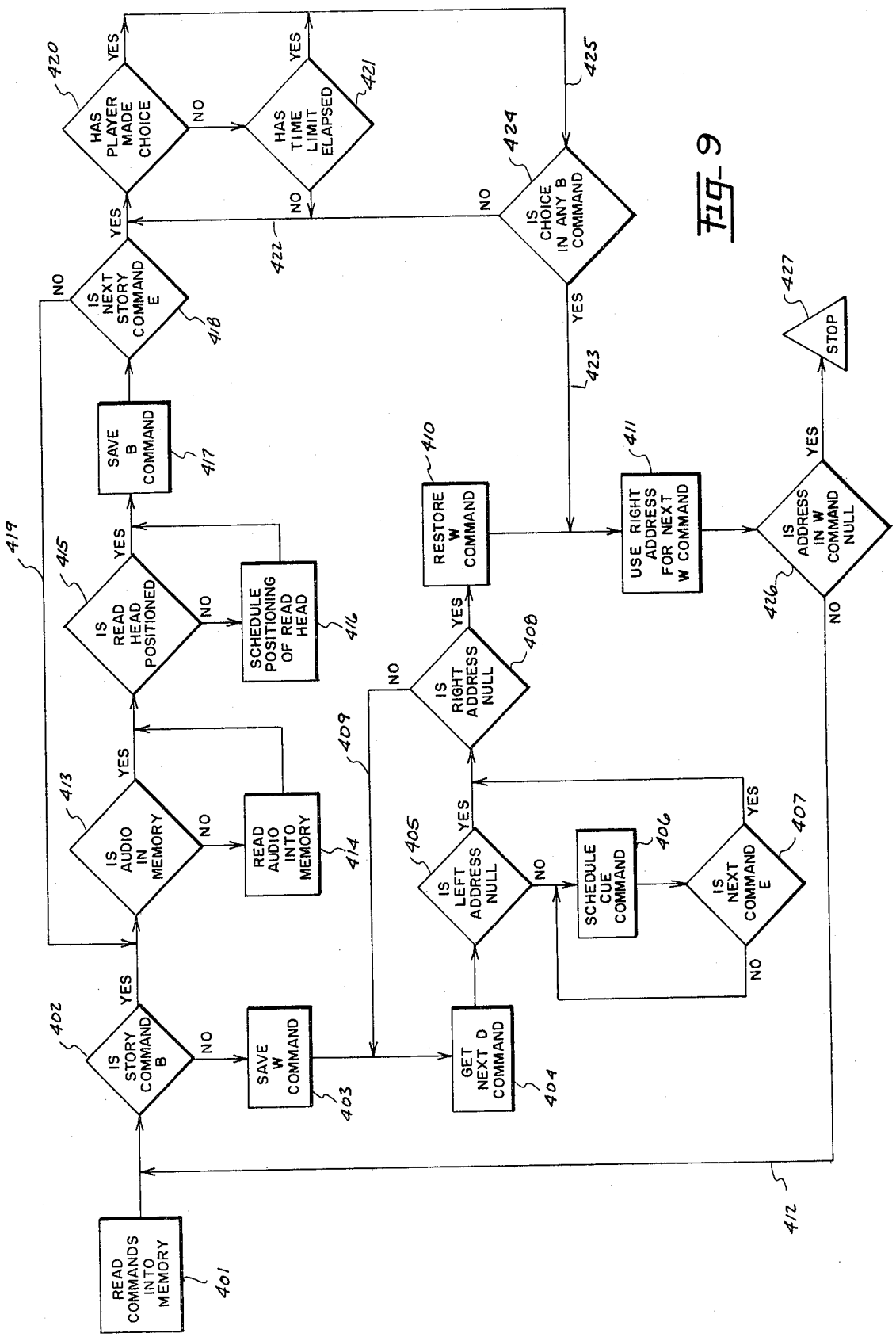
FIG. 9 is a process flowchart for one possible sequence which a programmed microprocessor may follow to perform the main functions of dispatcher unit 35.

Dispatcher unit 35 (the circuit detailed in FIG. 3 or a microprocessor programmed to perform equivalent functions) is the master scheduler and has final control of the course of the movie. By way of example, FIG. 9 illustrates a process for performing the main functions of dispatcher unit 35. Dispatcher unit 35 may request successive blocks of control information from retrieval unit 55 and output into random access memory 31 a schedule (called a cue table) of things for cueing unit 12 to do. Dispatcher 35 repeatedly updates the cue table schedule as the movie progresses. Dispatcher 35 processes the choices of the human players which are input via one or more hand-held input units 41 and/or 45, and stores different commands into cue table 31 depending on the player's choices.

Figure 5:
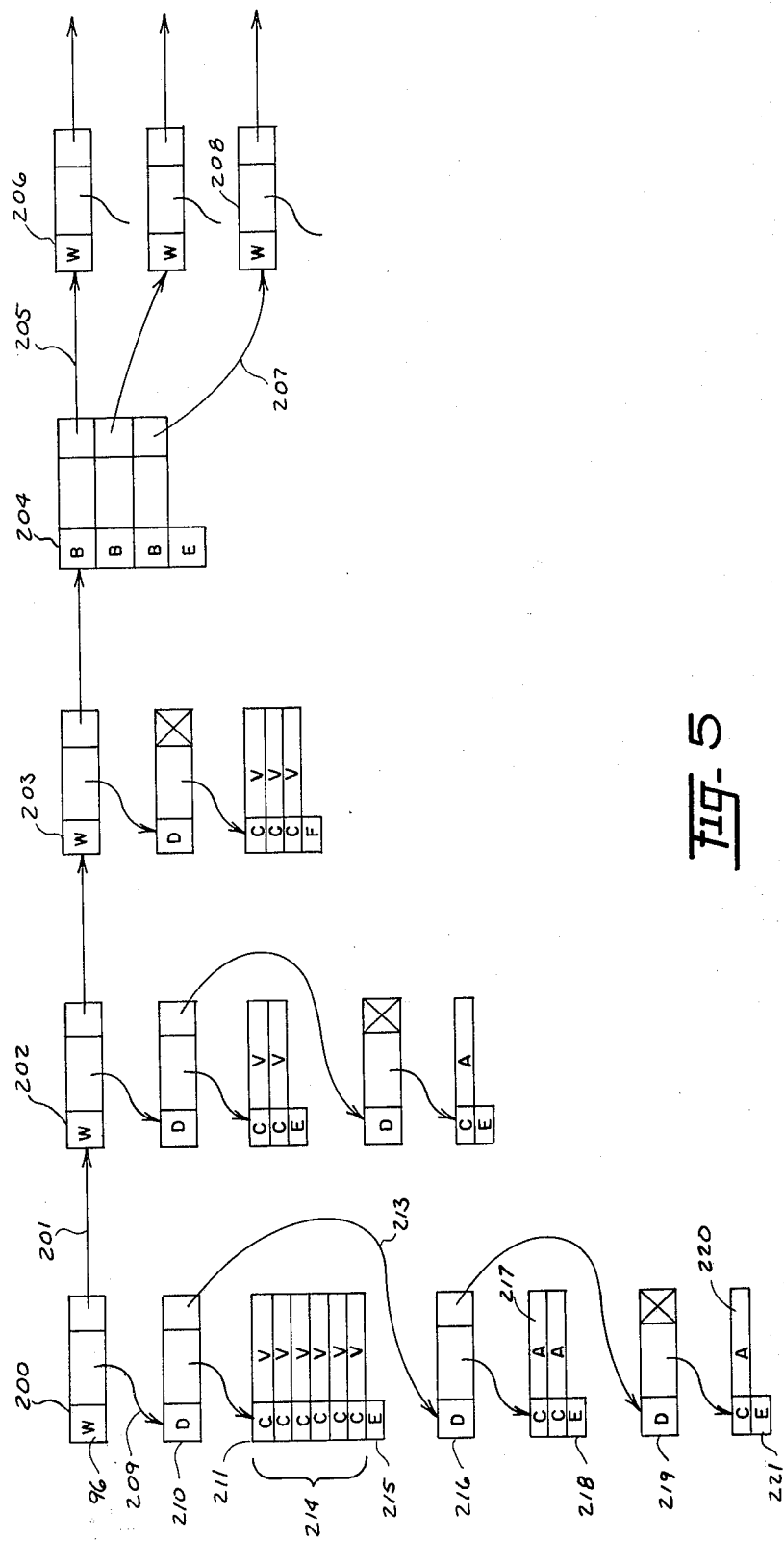
FIG. 5 illustrates a data structure network of story commands.

The digitally coded control information processed by dispatcher 35 includes blocks or schedules of digital pointers which form networks or chains of story commands and cue commands as illustrated in FIG. 5.

Figure 14:
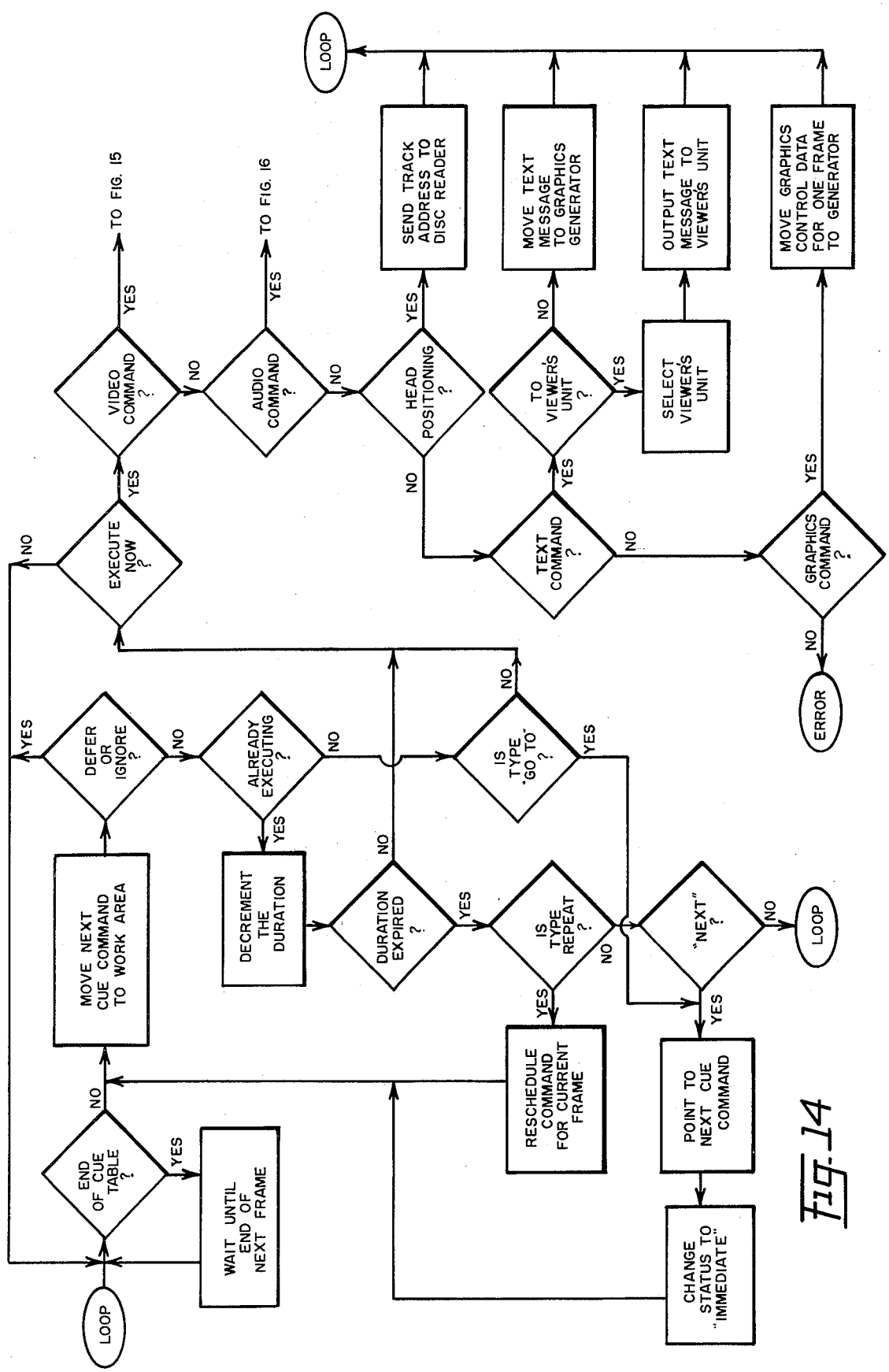
FIG. 14 is a process flowchart for one possible sequence which a programmed microprocessor may follow to perform the main functions of cueing unit 12.
Figure 15:
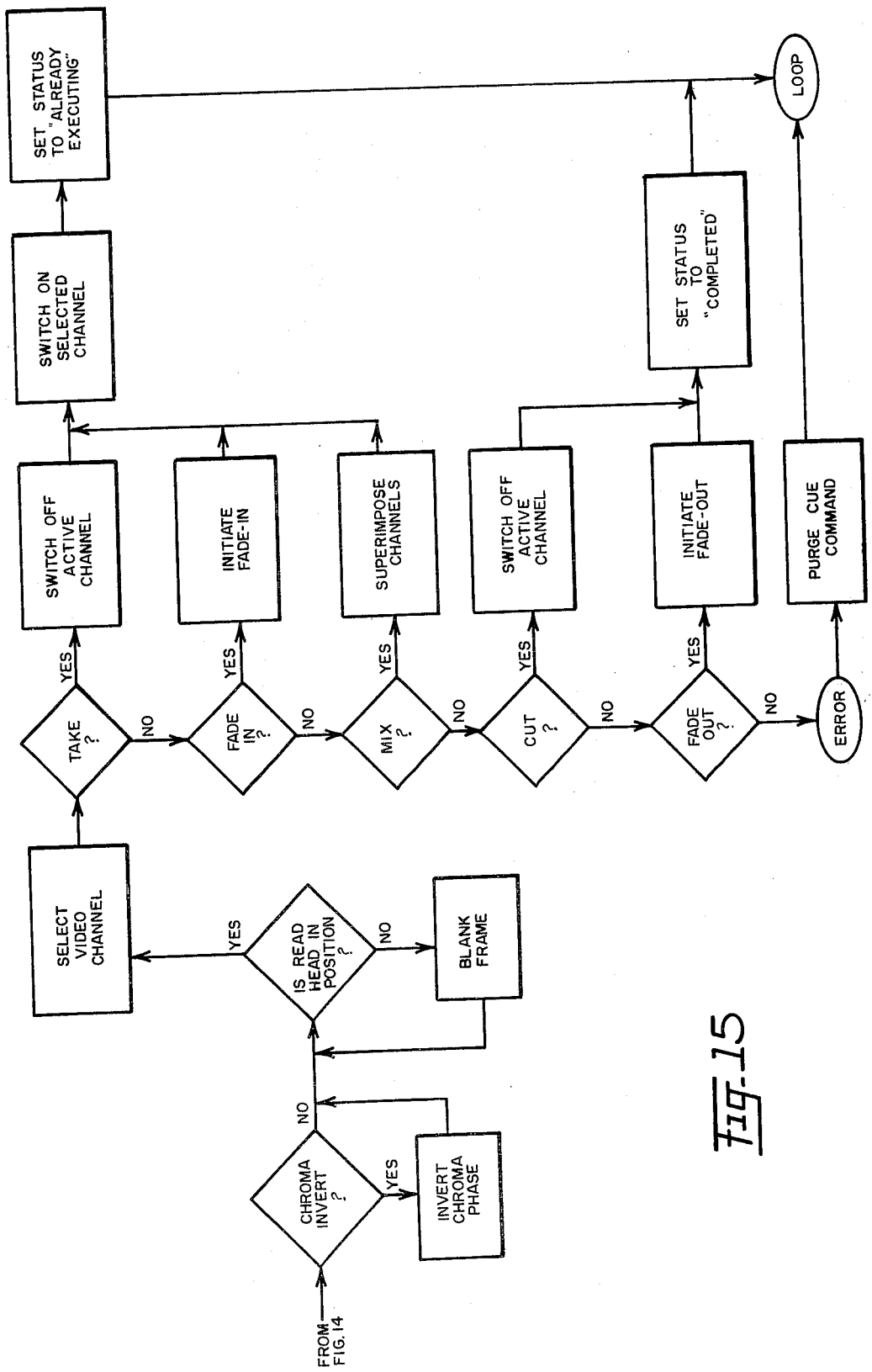
FIG. 15 is a continuation of FIG. 14 for video cue command processing.
Figure 16:
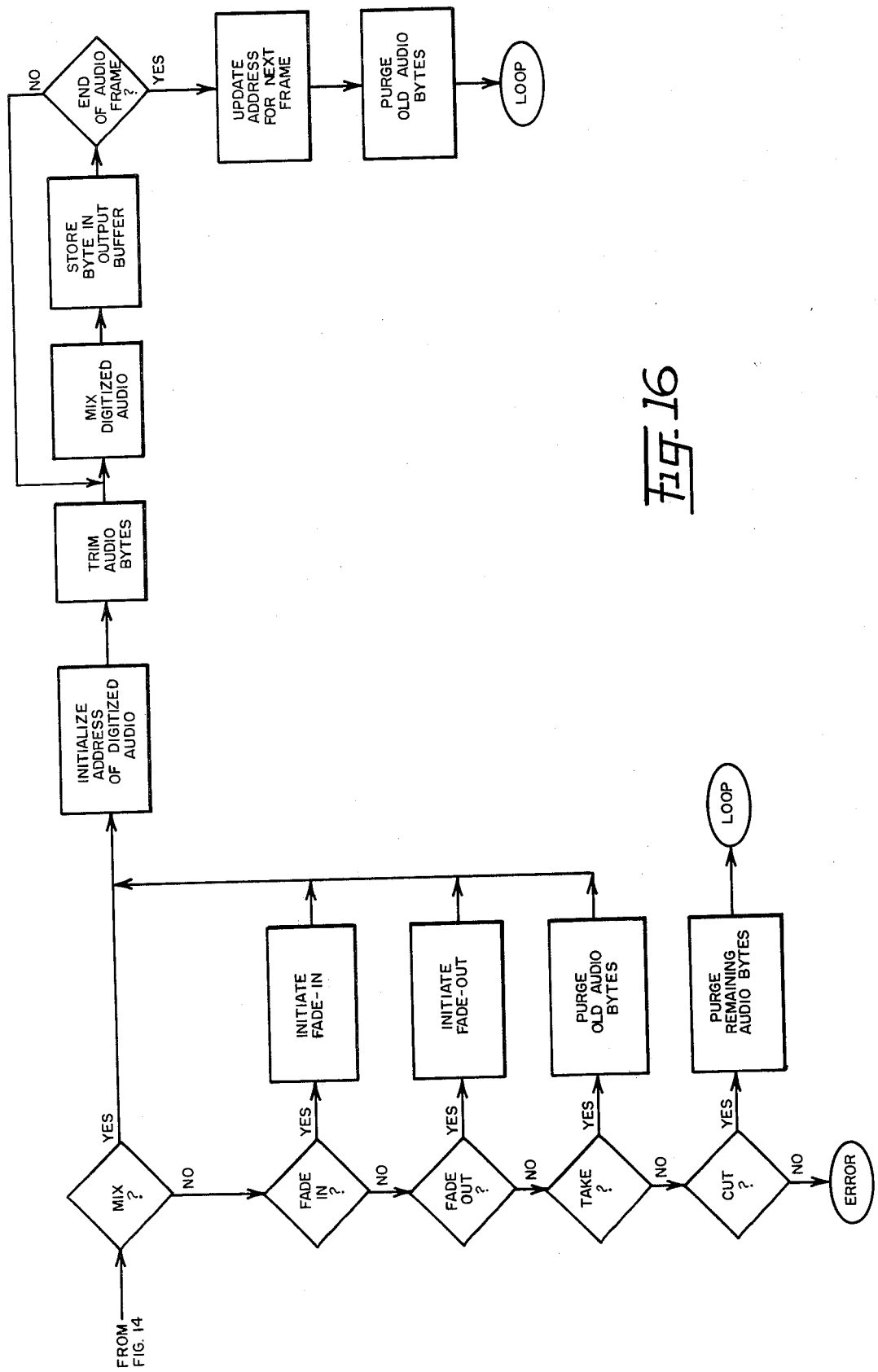
FIG. 16 is a continuation of FIG. 14 for audio cue command processing.

Cueing unit 12 (the circuit detailed in FIG. 4 or a microprocessor programmed to perform equivalent functions) repeatedly scans cue table 31 to get commands telling it what to do and the instant of time it should do it. By way of example, FIGS. 14-16 illustrate a process for performing cueing unit 12 functions. Cueing unit 12 edits digitized audio and other data already stored in random access memory 125 by retrieval unit 55. This editing process follows the commands in cue table 31 and generates a continuous sequence of output records (into register 19 in FIG. 4) containing edited, mixed, and synchronized audio in compressed digital form. Some of these edited records may contain graphics information (representing text, animation data, and/or special patterns) which are passed in cueing unit 12 to the graphics generator (block 126 in FIG. 4) which generates the video signals on line 146 representing the graphics display. This may consist of alphabetic characters which form titles large enough to be read from screen 27, lines which form patterns, the special shapes commonly found in video games, and/or animated cartoons.

Cueing unit 12 also controls the position of read head 51 or 54 which is currently reading video, and processes the composite video signal on line 11 from circuit 10. Although there may be many sequences of frames which occupy consecutive tracks on disc 52 (either spiral or circular), in general there will be frequent jumps to non-adjacent tracks. This random access movement is controlled in the conventional manner by electro-optical device 58 using track address searching during vertical blanking intervals. If a large jump to a distant track address is required, the other read head is positioned by cueing unit 12 in response to a command in cue table 31 to move to the distant track, well in advance of the time it is needed, so that a switch to the other head may be made automatically (by block 142 in FIG. 4) during the scheduled vertical interval without a discontinuity in the picture.

The sequence in which tracks are accessed by each read head is specified by the commands in cue table 31. During the picture, cueing unit 12 scans cue table 31 for the next command or commands which specify the next track address required by each head. If a spiral track is used, the conventional tracking circuitry 58 in the videodisc player 196 will automatically position the tracking mirror to the adjacent track as the disc rotates.

In an alternative embodiment of this invention shown in FIG. 12, the data read from disc 52 and/or magnetic bubble memory 173 may be compressed binary data from which graphics generator 126 generates animated cartoons. The compressed data required to generate a cartoon frame may be stored in a fraction of a disc track. Simple cartoons require less than 5 percent of the bits required by camera-originated video frames. Thus more than twenty times as many cartoon frames may be stored on a videodisc in compressed form. This permits several times as many genuinely different branching cartoon movies to be stored on one disc than can be stored as camera-originated frames. The cartoon frames may be expanded into hundreds of hours of entertainment and lip-synchronized with separately-stored audio using the apparatus and methods herein described. The same story control and synchronizing methods used with camera-originated video frames, may be used in this embodiment with internally generated animated cartoons. Graphics generator chips such as those used with prior-art video games may be used in the present invention (unit 126 in FIG. 4), but finer resolution may be achieved with the cartoon generator diagrammed in FIG. 17 and described below.

REMARKS ON VIDEODISC STORAGE

Prior-art videodiscs store information in circular or long spiral tracks which consist of micron-size pits in the disc. These tracks of pits may be read by an electro-optical laser read head or other transducer which converts the lengths of these pits into variable width pulses. This pulse-width modulation contains all the information needed to represent video frames, audio, vertical/horizontal sync, and track identification, and may also be used for storing digitized control data. The disc may rotate at 1800 RPM to 900 RPM so that one or two video frames may be read during one revolution of the disc. In the sectors of the disc corresponding to the vertical blanking intervals, a unique address or track (frame) identification code is stored for each track so that the read head can search for and lock onto any specified track. In embodiments which use the disc as a source of digitally coded data rather than video frames (for example if digitally-generated cartoons are used) then the disc may rotate more slowly than 900 RPM.

Although a spiral track is usually only one long series of pits, the word "track" is used herein to mean only that portion of the spiral covered in one disc revolution. Hence the term "adjacent tracks" may be used without being indefinite. Concentric circular tracks may also be used. Not all tracks need contain video frames. Any track may contain pulse-width modulated digitally-coded (binary) information such as compressed audio, graphics, animation, and control information. Such uses of the videodisc (except for animation) is discussed in the referenced paper by Kenney.

HOW THE INVENTION IS USED

Figure 13:
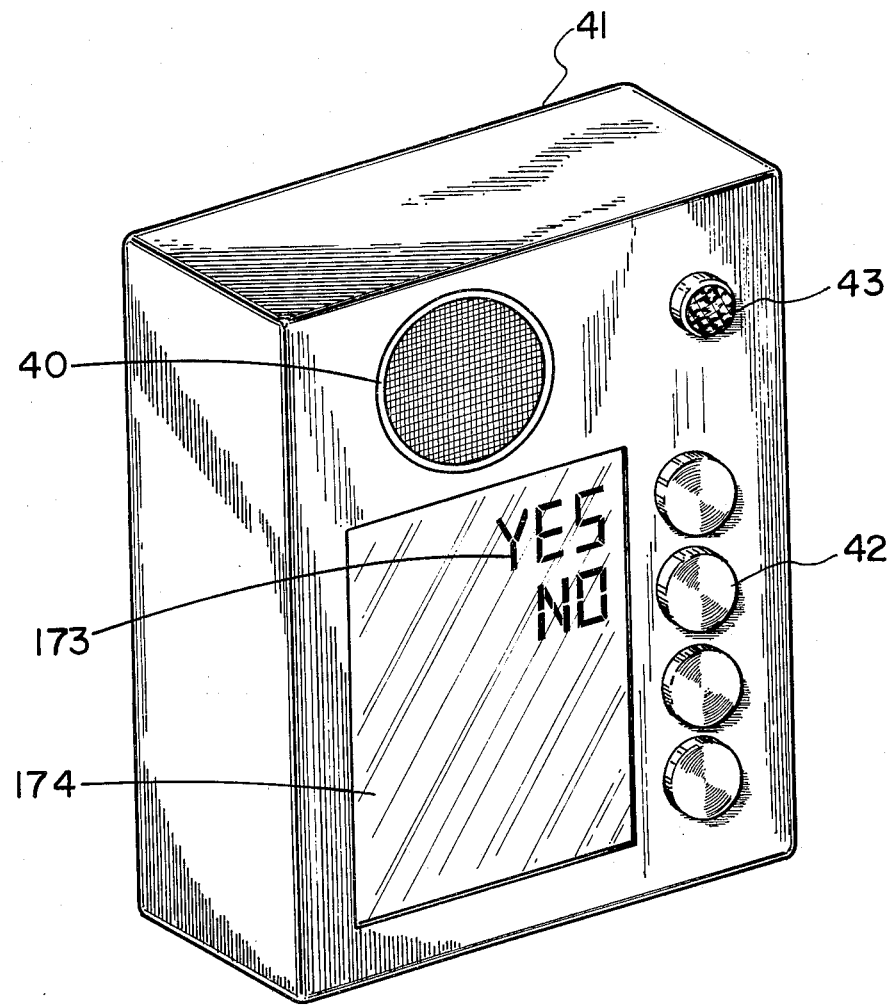
FIG. 13 is a pictorial view of a hand-held input device by which each player may influence the course of the movie.

At frequent branch points in the movie the apparatus presents the player with two or more alternatives to choose among, predetermined remarks to make to the actors, predetermined questions to ask, a yes/no decision to make, or the opportunity to interrupt the action or dialog. The player may manually or vocally enter his/her response or reply into hand-held input device 41 (FIGS. 1, 12, and 13). Dispatcher 35 processes the responses and electronically selects the next video and audio data from the videodisc.

Figure 10:
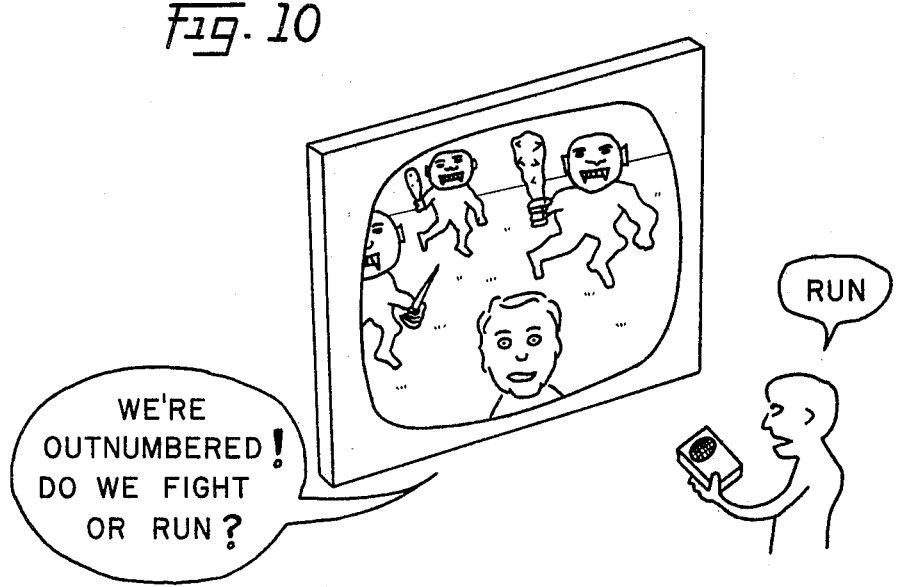
FIG. 10 is a cartoon illustrating a branch point in the movie when the viewer may choose alternative story lines by speaking into the apparatus.

FIG. 10 illustrates a typical branch point which leads either to a fight scene or a chase depending on the viewer's choice. In this illustration a chase will result. The video frames for the fight scene need not be wasted; they may be used in a later episode. The multiple choices are presented to the player in a sequence determined by previous choices. These may be displayed as titles on screen 27 or unit 41, or may be inferred by the players from the situation, or may be spoken by an actor. Such an actor, shown on the screen in FIG. 10 and called a "helper" in FIG. 11 block 461, is the player's alter ego in the movie and keeps the player(s) informed on what is happening, what problems require a decision, and what the options are. If the viewer plays the Lone Ranger, then Tonto appears frequently to guide the player into scenes which the videodisc recording is capable of providing.

A signal lamp 43 on the player's hand-held input unit 41 may be used to indicate that a response is expected. The player need not always be told when he can input a choice or interrupt a scene. Random choices may be made by the apparatus at predetermined points in the movie so that the sequence of scenes is different for each show. More than one player may participate by playing the roles of characters which are otherwise played by prerecorded images and voices of actors.

The alternatives which are acceptable to the apparatus may be explicitly spelled out for the player by a readable display such as the liquid crystal display 174 illustrated in FIG. 13. Each alternative word or phrase which the player may speak and be understood by voice recognition unit 38 may be displayed. Each such prompting message may be accompanied by a juxtaposed push button 42. Signal lamps such as lamp 43 may also be used to indicate alternatives for the player. The specific prompting messages sent to each unit 41 by transceiver 171 may be different for each player. These different options need not necessarily be revealed to other players. Branching movies which are also competitive games may use different messages so that each player does not know what is displayed on the other player's hand-held units. The prompting messages may change every few seconds if necessary. Cueing these displays is performed by cueing unit 12 as described below. The messages themselves may be stored on videodisc 52 or cartridge 15 and may be read by retrieval unit 55 along with digitized audio and control data.

More than one level of control may be used. For example, voice control could be used to respond to screen actors and prompting messages, but labeled push-buttons or touch pads could be used to interrupt and alter the normal flow of the movie (to repeat or skip a scene for example).

Figure 11:
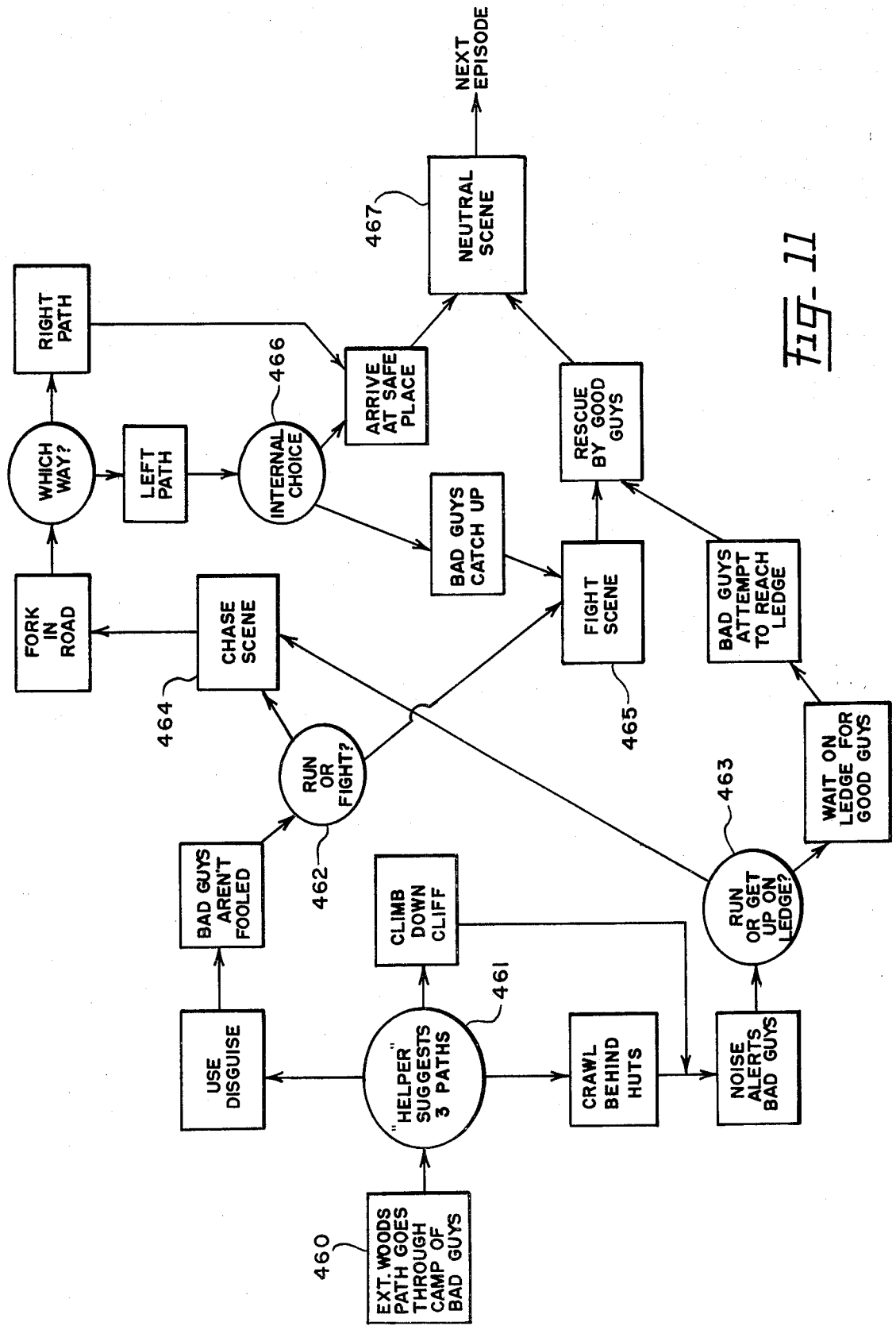
FIG. 11 is a storyboard diagram illustrating one episode of a branching movie.

Storyboarding a branching movie is more complex than a conventional movie. FIG. 11 shows a simplified storyboard in which the rectangles represent conventional shots or scenes and the ovals represent branch points. Note that multiple story lines (represented by arrows) can converge on a common scene. Chase scene 464 for example, can follow either branch point 462 or branch point 463 depending on an earlier choice at branch point 461. Not all branch points are controlled by the viewer. Branch points such as 466 may be internally controlled and may be a random unpredictable choice or may depend on whether fight scene 465 has been used recently or not.

To avoid a combinatorial explosion of alternative story lines which would exhaust the capacity of even the largest videodisc, it will generally be necessary for alternative story lines in each episode to converge to one or a few neutral scenes or shots such as block 467 before proceeding with the next episode. Because of this practical limitation, the apparatus is most suited to melodrama serials or series with short self-contained episodes. Several, perhaps a dozen, episodes would comprise one videodisc recording and would be played in succession with seamless transitions between episodes, so that the players, if they want to, can proceed to the next episode without being fully aware that one episode had ended and another begun. Some episodes may be skipped or presented in a different sequence for each showing. Sequences of episodes may loop back and repeat, but ritualistic cycles should be avoided except for those which already have general public acceptance. To avoid obvious repetition between shows which rerun the same video frames, the names of peripheral characters or locations can be changed by using a table of alternative names for insertion in the audio. Such disguised repetition may be reduced or avoided if digitally-generated animated cartoons are used in lieu of camera-originated video frames.

DESCRIPTION OF THE VOICE RECOGNITION UNIT

The embodiments of the present invention shown in FIGS. 1 and 12 include voice recognition circuit 38 to increase the realism of the illusion that the player is a personal participant in the movie. Unit 38 need only distinguish a few basic words such as "yes" and "no" to accomplish a one-sided dialog between each player and the apparatus. These basic words may be different for each branch point, but the number of alternative words that can be recognized at a given branch point should be limited to only relevant words, preferably less than seven, so that the search space covers not the whole vocabulary but only those few words. Recognition should be reasonably accurate, regardless of the sex and age of the players. At some branch point, recognizing the presence or absence of a voice sound may be sufficient. Because formant frequencies of the human voice vary greatly with sex and age, most prior-art recognition devices which analyze formant patterns for feature extraction (such as U.S. Pat. No. 3,943,295) require "training" the device to each individual's voice profile. Such recognition devices can be used with the present invention if in the opening episode each player is asked by a screen actor to pronounce each of the recognition words or phrases. This can be done unobtrusively while the player's are being introduced to the characters, the story, and to the use of the apparatus. However a voice recognition unit 38 which does not require training may be used, and has the advantage of simplicity from the viewpoint of the viewer. A voice recognition unit 38 may be used which initially is able to recognize basic words like "yes" and "no" without training, but is gradually training to recognize more complex words and phrases as the movie progresses.

In the present disclosure a simple voice recognition device is described which minimizes cost and avoids the training problem by recognizing two words at each branch point. Each pair of words is chosen so that one word contains an unvoiced fricative (the sss or fff sound) while the other word of the pair is voiced during the corresponding segment of the word. Thus "yes" is distinguished from "no" and the word "fight" is distinguished from "run" (using the example illustrated in FIG. 10). No attempt is made in this embodiment to distinguish formant frequencies or phoneme boundaries. Instead, each word to be recognized is segmented into two or more intervals of 100-600 milliseconds each, during which a count is made of zero crossings. Unvoiced fricatives produce a count of over 300 crossings per 100 ms, while voiced phonemes produce a count of less than 200. The word "yes" is thus distinguished from "no" by detecting that the second segment of the word has a large count of zero crossings which results from the high-frequency /s/ phoneme. With this simple recognition device the words "much" and "yes" will produce identical outputs.

More elaborate word recognition devices may be used for unit 38 if the vocabulary must include more than just two words at each branch point. For example, devices using two or more bandpass filters, fast Fourier analysis, autocorrelation, or other prior-art voice recognition methods may be used if the recognition device resides on a few (preferably one) integrated circuit chips. Push buttons 42 or proximity-sensing touch pads may be used for entering player's responses whenever spoken words or phrases would not seem natural or would be too difficult for unit 38 to recognize.

At some branch points it may be appropriate for the player to speak whole phrases which may be displayed as a menu of alternative prompting messages on screen 27 (FIG. 2) or display 174 (FIG. 13). To handle such situations, unit 38 may analyze only the first word of the phrase or may use prior-art "word-spotting" methods of recognizing keywords in continuous speech. There is no need for unit 38 to recognize every word in the phrase, because the alternatives may be restricted to only a few words or phrases at each branch point.

The decision-making logic of word recognition unit 38 may include decision trees, decision matrixes, best-fit template matching, and/or other methods for determining which preprogrammed set of voice characteristics or features most resemble the sound spoken by the human player. These characteristic features may include isolated words, words in continuous speech, phrases, non-word voice sounds, and/or a count of the number of phonemes or phoneme/phoneme combinations in the received sound. The presence of any sound above a given threshold may be used as a feature. Other types of characteristic features may be used.

Figure 6:
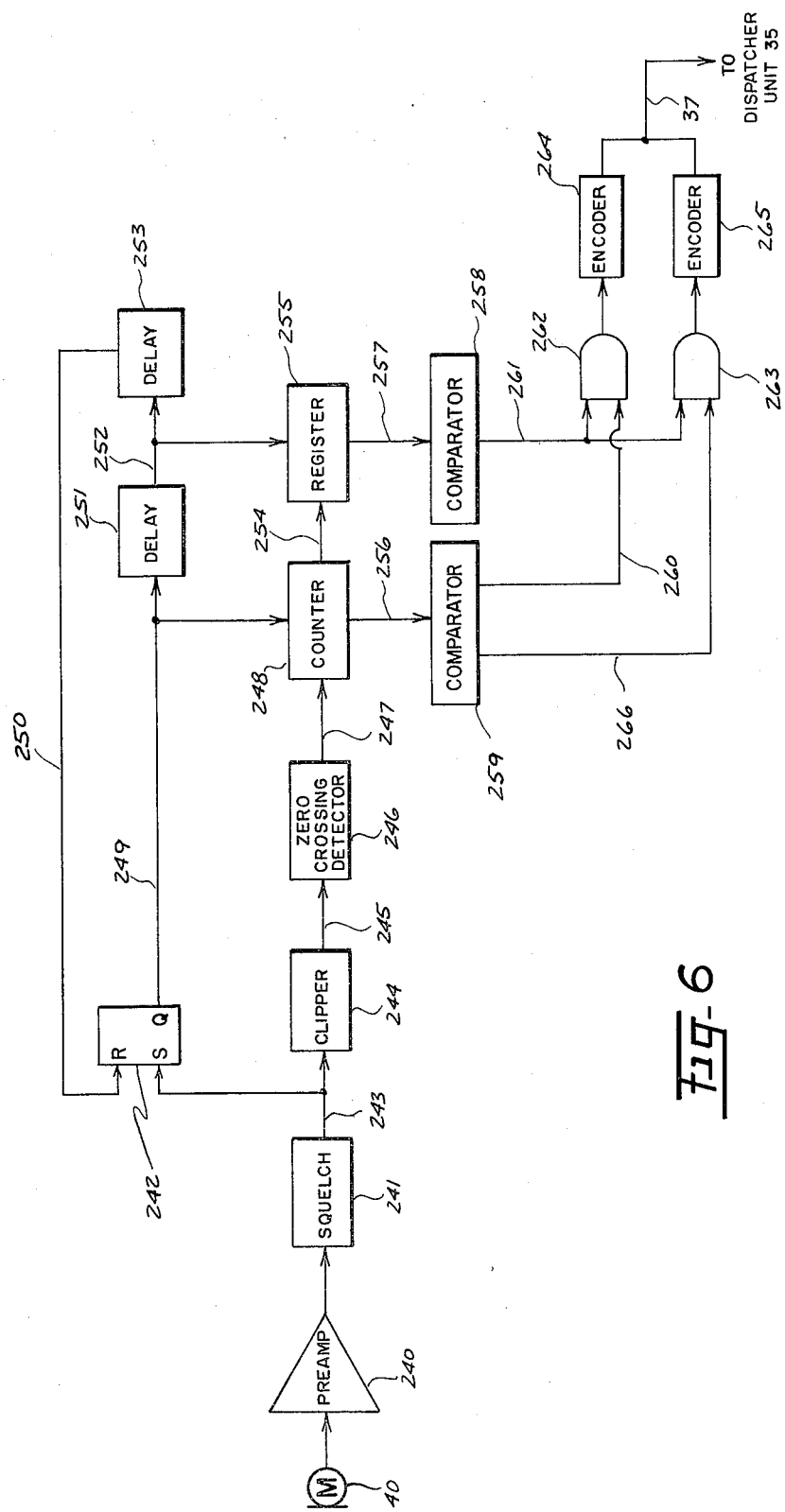
FIG. 6 is a detailed block diagram of the voice recognition unit apparatus (block 38 in FIG. 1) for one embodiment of the invention.

Referring to FIG. 6, a circuit is shown which is illustrative for the words "yes" and "no", but could, in practice, include similar circuits for other pairs of words. Microphone 40 in the player's hand-held input unit 41 converts the voice sound to audio which is amplified by preamp 240. Squelch circuit 241 passes the audio if the amplitude is greater than a preestablished threshold. When audio of sufficient amplitude is passed to line 243 it sets RD flip-flop 242 which signals the onset of the word on line 249. This signal 249 enables binary counter 248 and starts time delay circuit 251 which is preset to less than 120 ms. so that the delay will end before the unvoiced /s/ phoneme in "yes" is reached. The audio on line 243 is clipped by limiting circuit 244 so that only variable width pulses are fed via line 245 to zero-crossing detector circuit 246. Circuit 246 increments counter 248 via line 247 whenever a zero crossing occurs on line 245. When time delay circuit 251 reaches its preset limit it issues a signal on line 252 which starts time delay circuit 253 which may be preset to more than 500 ms. to catch all of the /s/ phoneme of "yes" even if the word is spoken slowly. The delayed signal on line 252 also enables register 255 which copies via line 254 the contents of counter 248 when line 252 goes true. Counter 248 continues counting zero crossings after being reset to zero. When time delay circuit 253 reaches its preset limit it issues a word-end signal on line 250 which resets flip-flop 242 so that counter 248 ceases counting. Thereafter, voice sounds are ignored by the recognition unit 38 until dispatcher unit 35 processes another branching story command in register 65.

The binary count in register 255 which represents the first segment of the word, is passed via line 257 to comparator circuit 258 which compares the count to fixed thresholds. Comparator 258 outputs a true signal on line 261 only if the count in register 255 is greater than a noise count of about 30 and less than 300. Thus if the first phoneme of the word is unvoiced, the signal on line 261 will be false. Since this signal 261 is ANDed in gates 262 and 263, a false signal on line 261 will produce no output on line 37. Thus the word will be ignored. If any voiced phoneme occurs in the first segment, signal 261 will be true thereby enabling the AND gates 262 and 263.

The binary count in counter 248 which represents the second segment of the word, is passed via line 256 to comparator circuit 259 which outputs a true signal on line 260 if the count in counter 248 is greater than 1200, or a true signal on line 266 if the count is less than 1200, or false signals on both lines 260 and 266 if the count is less than 30. Encoder 264 generates a "yes" code on line 37 if both signals into AND gate 262 are true. Encoder 265 generates a "no" code on line 37 if both signals into gate 263 are true. If neither gates 262 nor 263 go true, then the input word is ignored.

Many different types of voice recognition methods and apparatus are suitable for use with the present invention. The apparatus shown in FIG. 6 is illustrative of only one of many alternative circuits which may be used.

FUNCTIONAL DESCRIPTION OF COMMAND PROCESSING

Before dispatcher unit 35 and cueing unit 12 are described in detail, it is first necessary for the reader to understand the functions of the control information which the special-purpose apparatus processes. Intermingled among the disc tracks containing video frames and blocks of compressed audio and graphics, may be blocks of control information which are read by retrieval unit 35 into random access memory 85 for processing by dispatcher unit 35. This control information consists of story commands and cue commands. Cue commands specify what is to happen during an interval of time. Story commands represent points in time, and form chains which define each alternative story line. Branch points in the movie, when a player can choose among alternatives, are represented by special story commands which can point to several subsequent chains of story commands. This results in a complex web of story command chains illustrated in FIG. 5.

The embodiment described in this section which makes use of story commands and cue commands is intended to be illustrative only. Alternative embodiments may be used for accomplishing similar audiovisual effects, for example, by incorporating the cueing information into the story commands, or by eliminating the commands by including branching codes in the vertical blanking interval between video frames at branch points.

Story commands may consist of a 1-byte prefix followed by one or more addresses or data. Cue commands may be fixed or variable length records which are modified and moved to cue table 31 by dispatcher unit 35. Story commands may often contain pointers to cue commands. These pointers tell dispatcher unit 35 "schedule this cue command for this point in time". The time interval represented by each cue command is relative to all that has come before it. Thus if a cue command is inserted into a chain it may bump all subsequent cue commands down in time. Several cue commands may begin at the same point in time (for example video and audio which begin at the same instant). The story commands pointing to such synchronized cue commands are chained together and are stored in memory 85 one after the other in any convenient order.

In contrast to cueing unit 12 which executes the cue commands at the instant their start time arrives, dispatcher unit 35 processes the story commands several seconds ahead of the start time. As dispatcher unit 35 processes the story commands in each chain, it does not cause a cued event to happen. Rather, dispatcher 35 schedules that event by determining when the cue command should cause the event to happen.

When the dispatcher unit 35 processes a story command, it follows the chain of pointers to various cue commands to determine which optical read head 51 or 54 should be committed to which video track during which time interval, so that any blocks of audio/graphics that are required during that interval can be scheduled in advance while the head is still available. Dispatcher 35 cannot schedule video far beyond each branch point in the movie because there would be many more possible video sequences than there are heads to read it. But the control blocks and audio for every possible choice at the next branch point should be read into memory 85 and 86 in advance of the branch point so that when the player makes his/her decision the audio for line 22 can be generated without delay. Also a read head should be moved into position in advance to cover all alternative video tracks which may be required after the branch. This advance scheduling insures that there is no discontinuity in either the video or audio and that both remain in sync through the cue table rescheduling which dispatcher 35 does after each decision by a player. Each such branch point decision implies the abandonment of several command chains which dispatcher unit 35 should purge from memory 31, 85, 86 and 125 to make room for the next series of commands and blocks of audio/graphics.

Figure 7:
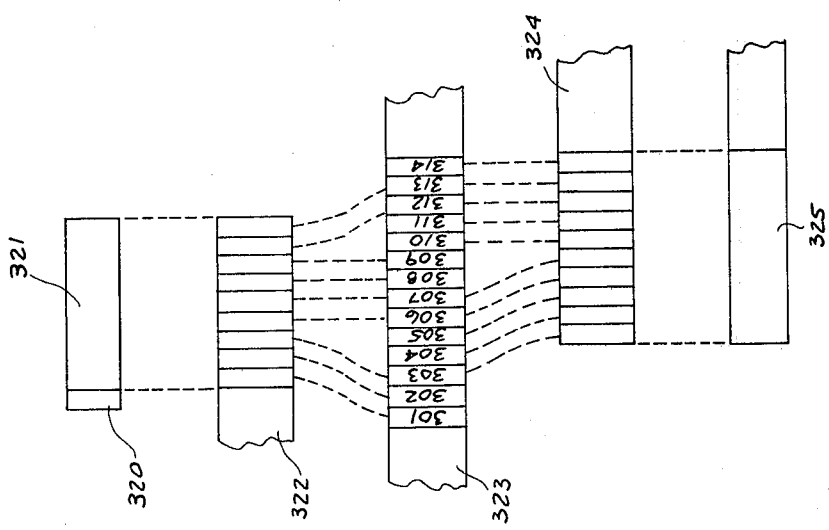
FIG. 7 illustrates how two different audio signals may be synchronized with a common set of multiple-use video frames.

To illustrate how one embodiment of the apparatus may recycle video frames and synchronize them with alternative audio tracks, consider the example in FIG. 7 in which the video sequence is the talking head of an actor and the audio tracks are his (or someone's) voice. Time is represented in FIG. 7 as flowing left to right. Strip 323 represents a sequence of video frames as they are recorded on the videodisc. Rectangle 301 represents one such video frame. But the frames are not read in strip 323 sequence; rather the frames are read first in strip 322 sequence through frame 313, then in strip 324 sequence from frame 303 through frame 314. Frame 303 is read a second time immediately following frame 313 because five of the frames (303, 306, 307, 312, 313) are used twice, thereby saving five tracks of videodisc space. Audio block 321 is synchronized with video sequence 322 and audio block 325 is synchronized with video sequence 324. The actor's head may move about during sequence 322, but frame 303 is chosen so that the head position of frame 313 is about the same as in frame 303, so that there is no sudden movement at the electronic "splice". This makes the splice a seamless one, i.e. one which is not obtrusive. The whole sequence of frames 301 through 314 requires seven cue commands, because there are five series of consecutive video frames to be addressed by cueing unit 12, and two audio blocks to be synchronized with the video. Dispatcher 35 schedules the first video frame 301 and audio 321 to begin in sync. A fractional frame 320 of audio block 321 is automatically trimmed to best sync with the video frames which begin with frame 301.

If video frames 301 through 314 were merely repeated as many times as needed to cover all the audio, something resembling badly looped foreign-language dubbing would result. The reason that frames 304 and 305 are skipped in sequence 322 and frames 308 and 309 skipped in sequence 324 is to best match the available inventory of video frames to each block of audio. To establish a precise match between the phonemes of each portion of digitized audio and a partial selection of video frames containing the closest approximation to the natural lip positions for those phonemes, the cue commands select video frames in the same sequence as the original video recording, but with many frames skipped. The cue commands then reuse the same frame sequence (perhaps in reverse order) with different frames skipped.

The video frames on disc 52 are thus regarded as an inventory of still frames which are selected to best fit the audio, as in sync voice cartoon animation. This selection is subject to many constraints, including a requirement that no jerky motion result, and that facial expressions, head movement, tone of voice, and gestures be consistent between video and audio. Each block of audio may require a different selection of video frames. Although this makes the recording complex, each second of reused video saves 30 tracks, while the disc space needed for the commands to accomplish the same audio/visual result is a fraction of one track.

The cost of programming such multiple usages of video frames should be balanced against maximizing the total hours of entertainment. A tradeoff may be made short of the extreme illustrated in FIG. 7. Multiple use of frames could be limited to shots with nonsynchronized sound, while each sync voice shot would use only one video/audio combination. By limiting the number of sync voice shots, the cost of programming and editing the master recording may be minimized without losing the efficiency of multiple usage.

Audio also requires automatic show-time editing, especially whenever frames of audio are inserted into an ongoing audio sequence. Several alternative audio inserts may be used which require slightly different timing. Also these audio inserts may be used with many different audio tracks each of which has a slightly different speech rhythm. An insert which starts at just the right frame in one sequence may cause an undesirable lag in another sequence. To correct this problem the cue command which invokes the audio insert also specifies how many eighths of frames of audio to omit at the beginning and end of the insert. Alternative audio inserts may each have different lengths which may require lengthing or shortening of the video frame sequence to preserve lip-sync. Each of these audio/video combinations may be specified by one pair of cue commands.

Each cue command in the illustrated embodiment is a fixed-length record of binary coded data and represents an interval of time that is scheduled to begin at the instant indicated within the cue command. There is at least one cue command for each series of consecutive video frames and for each fragment of audio. One scene may require hundreds of commands which are selected and stored into cue table 31 by dispatcher unit 35 and executed by cueing unit 12. Table 31 is therefore similar to a first-in/first-out queue, except at branch points in the movie when a player's decision may cause dispatcher unit 35 to abandon several commands in cue table 31 (representing video and audio not yet presented) and to replace them with several new commands representing the altered story line.

The twelve fields in each cue command are:
1. status code
2. start time
3. start code
4. type
5. channel
6. address
7. chroma invert
8. trim
9. attenuation/slowmotion
10. stereo
11. duration
12. finish code Many other cue command formats could be devised for the present invention and this format is illustrative only.

The status code may have one of five values:
defer till further notice
cue at the specified start time
cue immediately
currently executing
completed/abandoned When a given command is stored in cue table 31 by dispatcher 35 unit, the status code is initially set to zero so that cueing unit 12 will ignore it while the rest of the command is being stored. Once the command is stored in the table, dispatcher unit 35 changes the status code to "defer" which tells cueing unit 12 to wait for the start time specified in the command or to cue the indicated track immediately. Once cueing unit 12 has completed or abandoned the video/audio fragment, it resets the status code to indicate to dispatcher unit 35 that the command is of no further use and may be replaced by a new command. These commands need not be in any particular order in cue table 31, except for programmed loops as described below.

The start time specified in each command is a frame number which cueing unit 12 compares against a real-time frame counter that is incremented at the end of each video frame. When a block of story and cue commands is processed by dispatcher unit 35, the start time for each cue command is calculated by dispatcher unit 35 which inserts the start time into each cue command before storing it into the cue table, so that the commands are synchronized with the real-time frame counter. If a cue command is active, cueing unit 12 checks the start time against the real-time frame counter. When the counts agree the command becomes an immediate-execution command. The cueing unit then executes the cue command.

The "type" code in each cue command indicates what kind of information is to be processed. The possible types include:
video
audio
text characters
line graphics and cartoons
position the read head
go to A "video" command addresses the track to be shown next. Once the read head begins reading video it continues through consecutive frames until cueing unit 12 signals it to switch off. If the "position head" command is executed, the read head is moved to the addressed track, but the video signal being read is not shown yet. Another command (type "video") switches this video on at the scheduled frame. The other information types (audio, text, etc.) are not read directly from the disc, but from random-access memory. An "audio" command causes cueing unit 12 to edit the digitized audio already stored at the memory location specified in the command, and to output the edited audio to a fast-in/slow-out register (such as a charge-coupled device) where it is time-expanded into a conventional audio signal. Text and graphics are edited by cueing unit 12 and are output to a graphics generator which may generate animated cartoons. The "go to" code is for programming the commands into loops so that the dispatcher unit need not intervene at the end of each loop with a new set of commands. The "go to" code says continue with the command located in the cue table at the address given in the "address" field of this "go to" command. The "go to" command has no other effect. Loops of commands may be terminated by new commands cutting in, or by dispatcher unit 35.

The "channel" bit in the command is used for "video" and "position" types, and indicates which of the two read heads is to be used by the cueing unit, and which video channel circuits are to be used.

The "address" field in each command tells cueing unit 12 which disc track to position the read head to, for types "video" and "position". A zero address indicates a black screen. For the other types of commands the address indicates the location in random-access memory where the unedited information was stored by retrieval unit 55.

The "duration" field in the command contains the number of frames during which the command once started will be active. For video commands it is the number of consecutive tracks to be read from the disc. For audio and graphics it is the number of 1/30 second intervals during which the audio or graphics signal is generated. At the end of each frame cueing unit 12 adds the duration field and the start time field and checks if the sum is less than the real-time frame counter. If it is, then the command is completed and the finish code action (described below) is initiated.

The "start" and "finish" codes in the command indicate special editing for performing the transitions which occur at the beginning and end of a command action. The possible start codes include:
take
cancel
fade in
mix
A "take" code tells cueing unit 12 to stop whatever commands (of the same type) are currently active and start the new command in their place. With video for example, a "take" code says to stop reading the current track sequence at the end of the current frame and start reading the new track sequence (perhaps with the same read head). cueing unit 12 sets the status of the old commands to 3 because they are no longer needed. The "cancel" code interrupts a specified command (such as a freeze frame) and applies a "finish" code in lieu of the one present in the command being cancelled. This may be used when the time of completion of a command depends on a viewer's response and therefore cannot be preprogrammed in the command "duration" field. The "fade in" code tells cueing unit 12 to gradually turn on the new signal (video dissolves may use this code during a transition from one read head to the other). The speed with which the signal is faded in may be fixed in the circuitry or may be indicated by a field in the command. A "mix" code tells cueing unit 12 to superimpose the new information over whatever information is already being processed by other commands. Two video signals may be superimposed in this manner using both read heads. However, the mix code will normally be used in conjunction with the "attenuation" field for audio mixing. The apparatus for digitally mixing audio is discussed in detail below. Other effects such as matting, keying, wipes, reverse motion and time stretch/compress may be cued by the "start code" field. The "finish code" is like the start code except that it is invoked when the duration count is completed. The possible finish codes include:
cut
fade out
repeat
next The "cut" code tells cueing unit 12 to set the command status to "completed" when the duration count expires. Normally this is unnecessary because there will usually be a successor command that will terminate the current command. But if the next command indicates a mix, the cut code in the current command will prevent the read head from reading past the end of the current track sequence into the next track which might not contain video. The "fade out" code is the complement of "fade in" and may be used for video or audio commands. The "repeat" code tells cueing unit 12 to start the command over again when the duration expires and update the start time field so that the same sequence of video frames repeats again and again with the same duration for each loop until another command cuts in. A "repeat" code with a "duration" of 1 causes the addressed frame to repeat as a freeze frame. This "repeat" code may be used frequently to conserve disc space. The "next" code tells cueing unit 12 to deactivate the current command (to "defer" status) when it ends and to activate the command (from defer status to active status) located immediately after it in cue table 31.

The "trim" field in the command indicates the number of 1/240 second intervals of audio to be ignored when cueing unit 12 edits the digitized audio data in memory. This trim value is desirable for lip-sync dialog because the same digitized audio data may be used with many different video frame sequences, each of which may require slightly different timing. This synchronizing method is described below.

The "attenuation" field is used for mixing digitized audio and other uses. Digitized mixing is discussed in detail below. For video commands this field is used to indicate slow motion. Each frame in the series of consecutive frames will be shown N times where N is a binary number in the "attenuation" field. Thus if N is 30, each frame will be frozen for one second. But if N is 2 or 3, slowly moving pictures such as pans or crowd shots may be compressed on the disc by a factor of 2 or 3 without jerky motion. Disc space may thus be conserved using this method.

The "chroma invert" field is a one-bit flag which tells the cueing unit to invert the chroma phase (including burst) by 180°. This phase inversion may be required whenever an odd number of video frames are skipped. In the NTSC (National Television System Committee) color television standard, the chroma phase advances 180° with each frame. This presents no problem if an even number of frames are skipped (for example in the sequence: 1,2,3,4,7,8,11,12 . . . ) but if an odd number of frames are skipped, the receiver's color sync circuit would be burdened with reestablishing phase lock after each skip which may recur every few frames. Requiring that frames be skipped in pairs would avoid this problem, but this would reduce the ability of the apparatus to synchronize video and audio to within 1/30 second. So a chroma inverter circuit may be included which reverses the chroma phase when commanded by cueing unit 12, in accordance with the one-bit flag. This flag is set in each cue command by dispatcher unit 35 which checks whether an odd or even number of frames, if any, are being skipped for each command. In simple embodiments which use noninterlaced scan, the chroma invert flag may be omitted.

The "stereo" field is a 3-bit binary number used with audio commands for indicating the left-right position of the virtual "phantom image" of the sound in 2-speaker sound systems. Only one monaural sound signal is read from disc 52, but the apparatus can control the virtual position of the actor's voice by altering the relative amplitude and phase relationship between two audio signals generated from the same digitally encoded audio data. A "stereo" field of 001 means the voice image is at the extreme right, 100 means middle (balanced), 111 means extreme left. 000 is the same as 100 for videodiscs not using this pseudo-stereo sound feature. The purpose of using pseudo-stereo is to improve the feeling of presence and involvement when intercuts are made between talking actors, so that their voices will seem to come from different virtual positions in the room just as they would in real life.

DETAILED DESCRIPTION OF THE DISPATCHER UNIT

Figure 3:
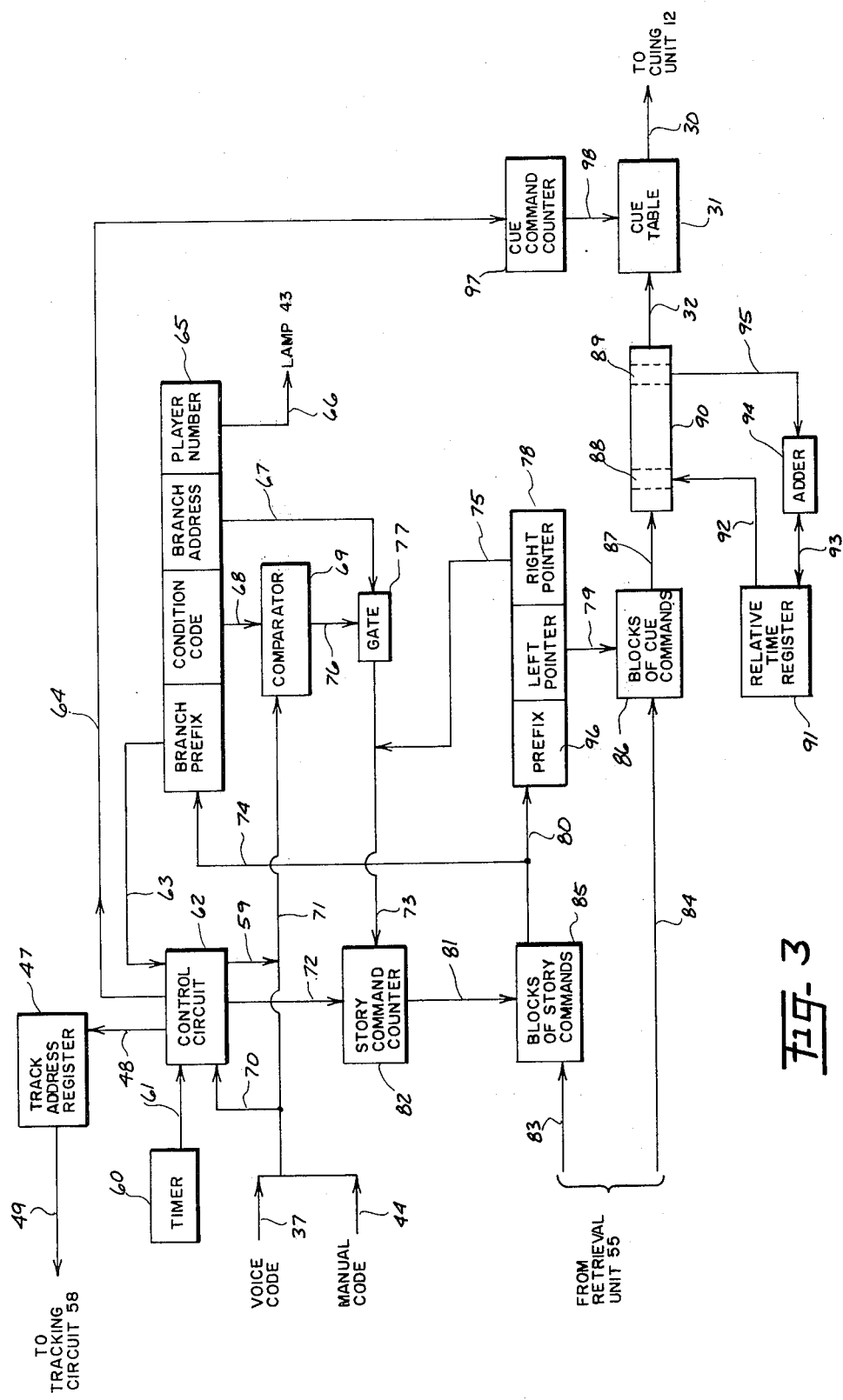
FIG. 3 is a detailed block diagram of the dispatcher unit apparatus (block 35 in FIG. 1) for one embodiment of the invention.

The detailed structure of one embodiment of dispatcher unit 35 is shown in FIG. 3. Dispatcher 35 receives schedules or blocks of digitally coded control data from retrieval unit 55 which stores story commands into random-access memory (RAM) 85 via line 83 and stores cue commands into memory 86 via line 84. Memories 85 and 86 are shown in FIG. 1 as a single block. Memory 86 may be an extention of memory 85 but the two memories are distinguished in FIG. 3 for clarity. The course of the movie is controlled by structures of story commands in memory 85. There are at least two kinds of story commands: branches which represent decision points in the movie, and pointers which point to cue commands and other story commands. Each kind of story command is fetched from memory 85 at a location specified by counter 82 which is incremented via line 72 by control circuit 62 so that chains of story commands in memory 85 are sequentially addressed for processing in register 65 or 78. Registers 65 and 78 may be conventional random access memory (RAM) working storage, but are shown separately in FIG. 3 for clarity.

A story command addressed by counter 82 is moved from memory 85 via bus 74 to register 65. The left-most byte (herein called the "prefix") of the story command in register 65 is moved via line 63 to control circuit 62 (to command decoder 530 in FIG. 20) which distinguishes branch commands from pointers. If the prefix on line 63 indicates a pointer, the story command is moved from memory 85 via bus 80 to register 78. The left pointer address of the story command in register 78 specifies a location of a cue command in memory 86. This cue command is addressed via line 79 and is moved via line 87 to register 90 for insertion of the start time (which will appear on line 105 in FIG. 4). The right pointer address of register 78 specifies the next story command in the chain of pointers (illustrated in FIG. 5).

Remember that each cue command represents an interval of time which is relative to the intervals which have preceeded it. The sum of all these prior intervals is the time at which the next interval will be scheduled. This cumulative time is stored in register 91 in units of 1/30 second. When a new cue command is moved to register 90, the start-time field 88 is initialized via line 92 with the cumulative time value in register 91. Register 91 is then updated by adder 94 which adds the duration field 89 from register 90 to register 91 via lines 95 and 93. Register 91 now represents the point in time immediately following the time interval for the cue command in register 90. This cue command is moved from register 90 via line 32 to cue table 31 at the next available location indicated by counter 97 which addresses cue table 31 via line 98. Control circuit 62 then increments counter 97 via line 64 to the next available unused location or to the location of an old completed cue command whose space in cue table 31 may be reused. Control circuit 62 also increments counter 82 via line 72 to address the next story command in memory 85. When the end of the block of story commands in memory 85 is reached, control circuit 62 updates track address register 47 via line 48 and requests the next block of commands from retrieval unit 55 specified to tracking circuit 58 by the track address on line 49.

Each cue command may be located in memory 85 immediately following story command prefix 96 to avoid the need for unnecessary pointers. This arrangement is used in FIG. 5. But in FIG. 3 the cue commands are explicitly pointed to by the left pointer in register 78 and are assigned separate memory (block 86) from the story commands (block 85) to clearly distinguish story command processing from cue command processing. The right pointer of the story command in register 78 specifies a successor story command in a chain of story commands. The right pointer in register 78 is moved via lines 75 and 73 to counter 82 which addresses via line 81 the successor story command in memory 85.

Referring to FIG. 5, a schematic flow diagram is shown for a typical chain or network of story commands. In contrast to the apparatus blocks in FIGS. 1 through 4, the blocks shown in FIG. 5 represent data, specifically story commands, and the arrows represent associative relationships between the commands. Blocks 200, 202, 203, etc. are pointer story commands which in FIG. 3 are sequentially fetched from memory 85 and processed in register 78. Blocks 204 are branch story commands which in FIG. 3 are processed in register 65. In various command prefixes shown in FIG. 5, such as prefix 96, indicate what kind of story command it is. The prefixes may be B for Branch, W for Wait, D for Do, C for Cue, and E for End. Numeric (binary) prefixed could be used in practice, but letters are shown in FIG. 5 as an aid to understanding.

The branching chain shown in FIG. 5 consists of a horizontal chain of right pointers, and vertical columns formed from chains of left pointers. At the end of each branch of each chain is one or more cue commands, such as video cue commands 214 and audio cue commands 217 and 220. At the end of the last episode of the movie there may be a final schedule of pointers which does not branch, but instead shuts off the system. Or alternatively, the final episode may loop back to the beginning of the network of story commands to begin with the first or another episode.

Although cue commands 214 are shown in FIG. 5 as having equal length, in practice the first cue command of each series could be full length, but subsequent cue commands in the series could be shortened by omitting redundant information such as start code, finish code, attentuation, etc.

The reason the branched chain shown in FIG. 5 is arranged in columns linked together horizontally is to emphasize an important distinction. Remember that some things must happen substantially (such as sequences of video frames), but other things must happen concurrently (such as synchronize audio and video). The horizontal chain at the top of FIG. 5 (blocks 200 through 206) represent things to be scheduled for sequential execution by cueing unit 12. Each vertical chain in FIG. 5 (blocks 210 through 219) represent things to be scheduled for concurrent execution by cueing unit 12. However, at the end of each branch there are one or more (usually several) cue commands (such as block 214) which are executed sequentially. At the end of each such sequence there is a one-byte E prefix (215, 218 and 221 in FIG. 5) which is passed via line 63 in FIG. 3 to control circuit 62 instructing it to discontinue the sequence of cue commands addressed via line 79 by the left pointer in register 78, and instead, instructs control circuit 62 to proceed to the next column in the chain specified by the right pointer in register 78 which via lines 75, 73 and 81 addresses the next story command in memory 85. For example, in FIG. 5 when all of the E prefixes (215, 218 and 221) have been reached in the scheduling of the commands in the column headed by story command 200, command 200 is returned to register 78 in FIG. 3 to obtain the right pointer (line 201 in FIG. 5) which addresses the next story command 202 from memory 85. Command 202 replaces command 200 in register 78, and processing continues with the second column in FIG. 5 (headed by block 202).

Since story commands 210, 216 and 219, which are chained together via their right pointers, each contains a D prefix (for Do), each of the chains of cue commands pointed to by their left pointers is scheduled to begin at the same point in time (specified by register 91 in FIG. 3). Typically, the video frames pointed to by cue commands 214 will be sequentially displayed, but this video will run concurrently with the audio pointed to by cue commands 217, and also concurrently with the audio pointed to by cue command 220. Command 220 may point to the digitized name of one of the players as spoken by the same actor whose digitized voice is pointed to by commands 217. Command 220, in other words, may represent an audio insert. The video frames pointed to by commands 214 are preselected to best synchronize with audio 217 and 220, not only for lip-sync reasons, but also for consistency with facial expressions, gestures, tone of voice, etc.

The W prefix (for Wait) in story command 200 instructs control unit 62 not to fetch command 202 into registers 65 and 78 until after all the E prefixes 215, 218, 221 subordinate to command 200 have been reached.

Note that the right pointer of the last story command in each vertical chain (such as 219) has an X in it, which is a null pointer indicating the end of the chain.

Story commands 204 in FIG. 5 represent a branch point in the story line which can lead to several alternative chains of story commands (such as 206 and 208) depending on the player's choices. Referring again to FIG. 3, when a story command is moved from memory 85 bus via 74 to register 65 the prefix is moved via line 63 from register 65 to control circuit 62 (to decoder 530 in FIG. 20). Several types of branch commands may be used. The branch code prefix on line 63 may indicate an unconditional jump, in which case the memory address in counter 82 is replaced via lines 67 and 73 with the branch-address field from register 65.

Figure 20:
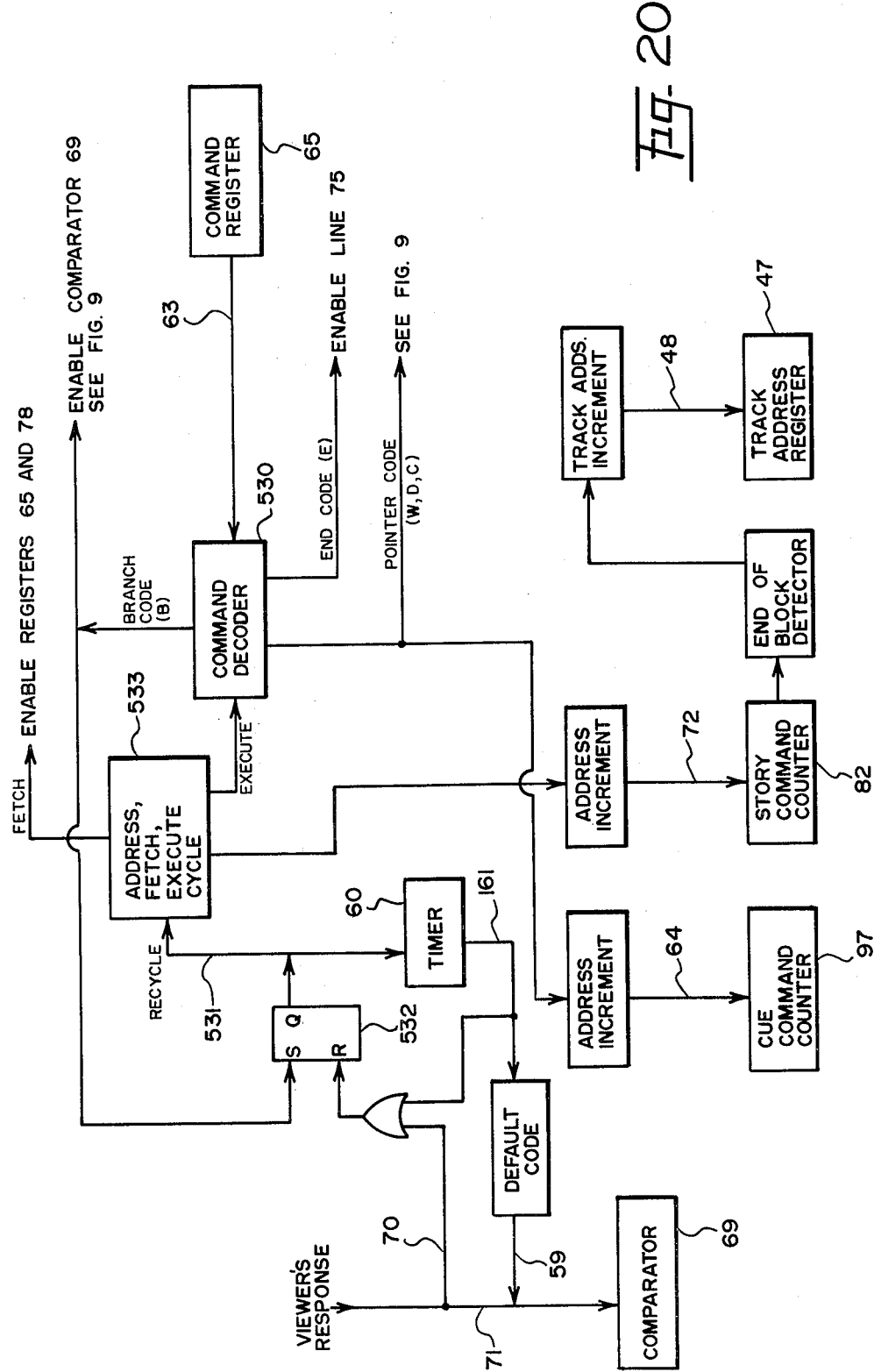
FIG. 20 is a detailed block diagram of the control circuits (block 62 in FIG. 3) of the dispatcher unit for one embodiment of the invention.

Most branch commands will represent decision points in the movie when the player can input a verbal response via microphone 40 (FIG. 1) or via push buttons 42 (FIG. 1). These signals are represented in FIG. 3 on lines 37 and 44 respectively as a 4-bit binary code which is passed via line 71 to comparator 69 which compares the binary code on line 71 with the condition code on line 68 from a succession of branch commands in register 65. If an inappropriate response code is present on line 71 it will not match any codes on line 68 and will therefore be ignored. If no new response is entered by the player, control circuit 62 will not receive the response code via line 70. Control circuit 62 decrements timer 60 which imposes a time limit (of a few seconds) on the player's response, i.e. while RS flip-flop 532 in FIG. 20 is set. During this period a true signal on line 531 inhibits sequential cycle controller 533 from proceeding to the next series of pointer commands so that the branch commands recycle through register 65. The loop is indicated by diamonds 420 and 421 in FIG. 9. When the time limit expires in timer 60, control circuit 62 forces a default reponse code onto line 71 via lines 161 and 59 so that comparator 69 will detect a match with one of the branch commands in register 65.

When comparator 69 detects a match, it enables gate 77 via line 76 which causes the branch address field in register 65 to replace the address in counter 82 via lines 67 and 73. The next story command obtained from memory 85 at a location specified by the new branch address in counter 82 and bus 81, will be a new series of pointer commands for register 78 which represent the new story line appropriate to the player's response or lack of response.

Circuitry for only one player is shown in the drawings. But more than one player may be entering inputs from their hand-held input units. So it may be desirable to include a field in the branch commands to indicate which player is expected to respond. This player number field may signal prompt lamp 43 to light up on the appropriate player's unit via line 66 in cable 46 or via transceiver 171 (FIG. 12).

Other types of story commands may be used. For example a random-choice command may be used to cause a branch in the story line which is unpredictable by the players and which may use a different branch address (on line 67) for each show. Another type of story command may initialize timer 60 to a specified time limit or delay.

Story commands which test previously-set conditions may be used to permit a variable number of players. Each player plays the role of a character whose prerecorded voice and images are bypassed if a human is playing that role. After the players inform microcomputer 50 in FIG. 2 (through a series of questions and answers) of how many players there are and who is playing which role, this information can be tested frequently using branch commands which cause branch address 67 to be taken if a human player is playing that role, but proceed to the next sequential branch command if the role is to be played by a prerecorded image of an actor(s).

DESCRIPTION OF THE DISPATCHER UNIT PROCESS

In the preceeding section the structure of dispatcher unit 35 was described in detail using a discrete-component embodiment (FIG. 3) as illustrative. As previously noted, there are many alternative embodiments which are equivalent to those herein disclosed. One such embodiment is a microprocessor circuit which is made special-purpose by the fixed program which it executes and by the specific circuitry to which it is attached. Dispatcher unit 35 may be so embodied as a programmed microprocessor electrically connected to other circuitry as shown in FIG. 1. Dispatcher 35 may perform processing equivalent to that described in the preceeding section by performing a sequence of steps such as the sequence shown by flowchart FIG. 9.

Referring to FIG. 9, the story commands and cue commands are read into memory during step 401. This may be done all at once when the apparatus is first turned on, or may be done piecemeal. Step 402 tests the prefix of the first story command for the code "B" or a numeric equivalent. Most likely the first command is not a B (Branch), but sooner or later the loop indicated by line 412 will encounter a B command, in which case control proceeds to step 413 (described below). Block 200 in FIG. 5 represent the kind of command being processed at this point, namely a W (Wait) command. So control proceeds to step 403 which stores the W command into working storage. The left address of the W command is a pointer to the D command (block 210 in FIG. 5). This D command is picked up in step 404. Step 405 then checks whether the left address of the D command points to a cue command (block 212 in FIG. 5). If it does so, control proceeds to stop 406 which schedules the cue command by storing it in cue table 31 (see FIG. 1) after modifying the start time field 88 as described in the preceeding section. After step 406 has finished, step 407 checks the next cue command which immediately follows command 212 in memory 85. If the prefix is not an E (for End), control loops back to step 406 to schedule another cue command. If it is an E, control proceeds to step 408 which checks the right address of the D command got during step 404. If the right address points to the next D command (block 216 pointed to by address 213 in FIG. 5), control loops back to step 404 (via line 409) to get the next D command. Steps 404 through 408 continue to loop in this sequence until a D command is encountered which does not have a pointer in its right address (block 219 in FIG. 5). When step 408 encounters such a D command it passes control to stop 410 which restores the W command saved by step 403. The right address of this W command is used in step 411 as a pointer to the next W or B command (block 202 pointed to by address 201 in FIG. 5). But if it is an E code step 426 terminates the show by passing control to step 427 which stops the apparatus. Otherwise, the control loops back to step 402 which checks the new story command picked up by step 411.

Suppose this command is a B command like block 204 in FIG. 5. Step 402 then passes control to step 413 which checks whether the audio blocks pointed to by cue commands for the current B command has been read by retrieval unit 55 into memory 125. If not, step 414 requests retrieval unit 55 to read this block of audio. Step 415 then checks whether electro-optical read heads 51 and 54 have been positioned for the video frames if the current B command will match the choice code sent to dispatcher unit 35 from hand-held input device 41. At this stage in the processing (before the player has made his/her choice) all contingencies should be prescheduled in cue table 31. If step 415 finds that the read head is not yet scheduled, step 416 is performed which stores a head-positioning cue command into cue table 31. Step 417 then saves the B command in working storage for later use by step 411. The next byte of memory after the B command is then checked in step 418 for an E (end) code. If another B command is found, control loops back (line 419) to step 413 to process the next B command. Steps 413 through 418 continue to loop through several B commands until the E code is encountered, at which time control is passed to step 420. Step 420 checks signal bus 70 in FIG. 3 for an indication that the player has made a choice. If he has, control proceeds (via line 425) to step 424. If no choice has occurred, timer 60 is checked in step 421. If the time limit has elapsed, control proceeds to step 424. Otherwise control loops back (via line 422) to step 420. Loop 422 continues until either the time elapses or the player makes a choice. In either case, step 424 searches the B commands saved during step 417 for a match with the choice code on bus 70 in FIG. 3. If no match is found, the player is incorrectly pressing a button which is not used at this branch point so his/her choice is ignored by continuing the 422 loop. When a choice is found by step 424 (which may be the default choice forced by step 421, control proceeds to step 411 which picks up the address of the next W command (block 208 pointed to by address 207 in FIG. 5).

DETAILED DESCRIPTION OF THE CUEING UNIT

Figure 4:
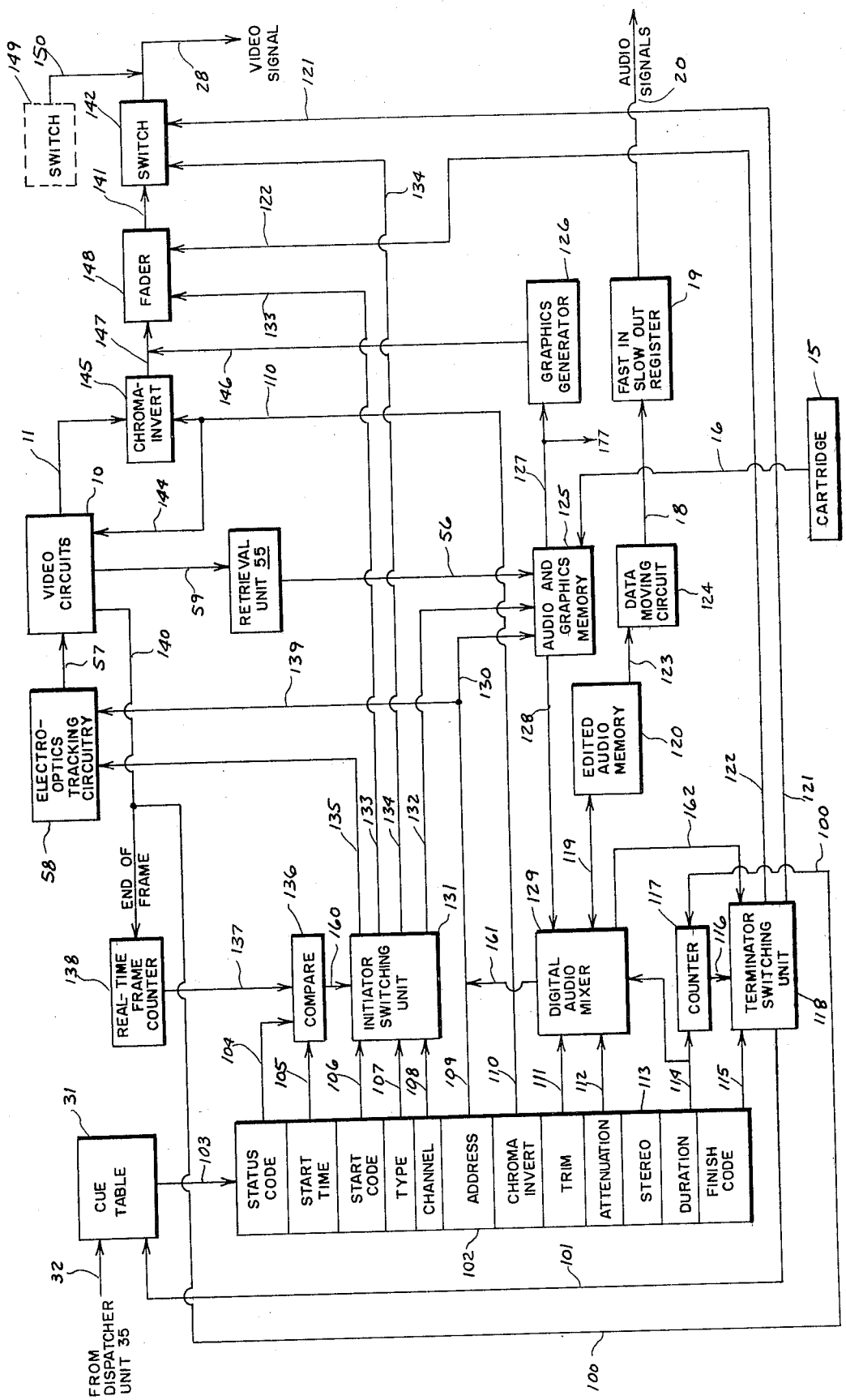
FIG. 4 is a detailed block diagram of the cueing unit apparatus (block 12 in FIG. 1) for one embodiment of the invention. Also shown are some of the blocks with which cueing unit 12 interfaces.

The detailed structure of one embodiment of cueing unit 12 is shown in FIG. 4. A flowchart for cue command processing is shown in FIG. 14 which illustrates one of many sequences of steps which may be used to perform the functions of cueing unit 12. Referring to FIG. 4, each cue command is moved one at a time from cue table 31 via line 103 into buffer 102 which may consist of several bytes of conventional random-access memory (RAM) or a special purpose register. The bits of buffer 102 are arranged in fields of one or more bits which are processed via lines 104–115 in FIG. 4. Each line schematically represents one or more wires, depending on the number of bits in the respective buffer 102 field.

At the end of each video frame, circuit 10 sends a clock pulse via line 140 to increment real-time frame counter 138, a conventional binary counter. This clock pulse may be generated at the end of each field if desired. The time value in counter 138 is compared in comparator 136 to the start time bits on line 105 from buffer 102 for each cue command. If comparator 136 determines that the start time value on line 105 is greater than or equal to the real-time value on line 137 it sends an initiating signal via line 160 to initiator switching circuit 131. This initiation signal is suppressed if the 3-bit status code on line 104 indicates that the command is to be ignored. Conversely if the status line 104 indicates that the command is to be executed immediately, comparator 136 sends an immediate initiating signal via line 160 to initiator 131.

Figure 21:
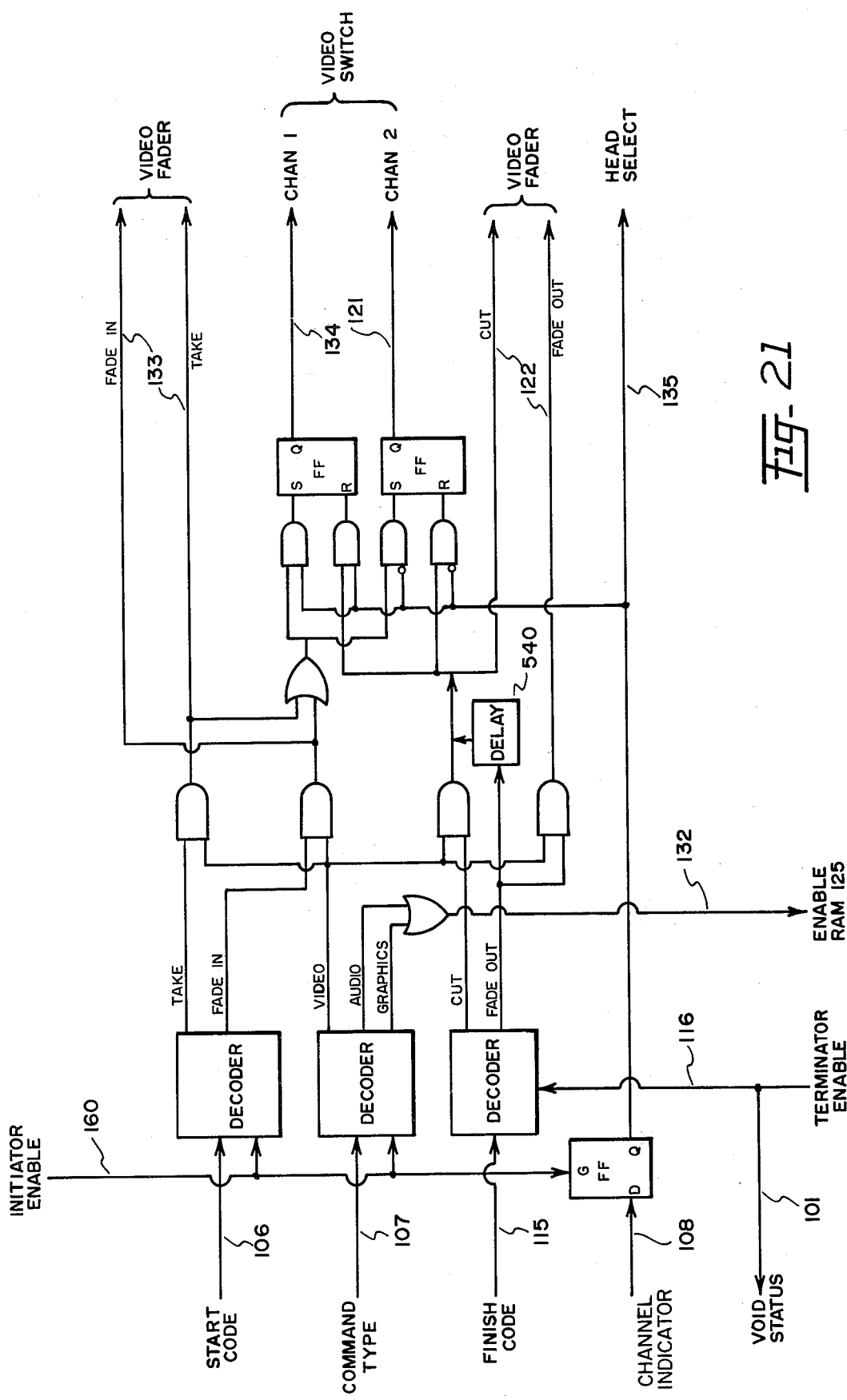
FIG. 21 is a detailed block diagram of the initiator switching unit (block 131 in FIG. 4) combined with the terminator switching unit (block 118 in FIG. 4) of cueing unit 12 for one embodiment of the invention.

Initiator circuit 131 (detailed in FIG. 21) generates various switching signals on lines 132–135 depending on the 3-bit start code on line 106, the 3-bit command-type code on line 107 and the 1-bit channel indicator on line 108. If the type code 107 indicates a video command, initiator 131 leaves audio memory control line 132 unchanged, enables video fader control lines 133, enables video switch 142 via lines 134, and selects the read head indicated by channel bit 108 via line 135 and tracking circuit 58. If start code 106 indicates "take" and channel bit 108 indicates a change in read heads, initiator 131 signals video switch 142 via lines 134 to switch off the video channel for the frame just completed and to switch on the other channel after tracking circuit 58 has positioned the read head to the track addressed on bus 139. This 18-bit track address is obtained via bus 109 from the command in buffer 102. If no head change is specified by channel bit 108, the video switch signal on lines 134 remains unchanged. If start signal 106 indicates "fade in", initiator 131 signals video fader 148 via lines 133 to gradually increase the amplitude of the picture component of the composite video signal on line 141. If start signal 106 indicates "mix", the control signals on lines 133 and 134 remain unchanged for the occupied channel, but signal the switch 142 or fader 148 to perform a take or fade-in for the newly selected channel specified by channel bit 108. A mix without a head change implies there is only one read head in this unit, so initiator 131 will treat this command as a take. If start code 106 indicates "cancel", the switch 142 and facer 148 are controlled by terminator circuit 118 which is described below.

The chroma invert signal on line 110 changes whenever an odd number of video frames are skipped, to avoid loss of chroma phase lock. Signal 110 causes conventional inverter circuit 145 to shift by 180° the phase of the chroma portion of the composite video signal on line 11, and recombine the inverted chroma with the luminance portion, so that the composite signal on line 147 will continue in phase with the color subcarrier. The invert signal on line 144 causes video circuit 10 to invert the burst signal (see FIG. 19) so that it too is in phase with the subcarrier.

If type signal 107 indicates a head-positioning command, control lines 133 and 134 remain unchanged for the occupied channel, so the video signal passing through blocks 58, 10, 145, 148, and 142 will not be disturbed. Head selection signal 108 is passed via initiator 131 and line 135 to tracking circuit 58 in conjunction with the track address on buses 109 and 139. Tracking circuit 58 then positions the unoccupied read head to the track address specified on bus 139. However, switch 142 for the selected channel is not enabled.

If type signal 107 indicates "go to", the cue command in cue table 31 located at the relative address given on bus 109 is loaded into buffer 102 via line 103 replacing the current "go to" command and is given "immediate" status on line 104. The "go to" command is given "defer" status in cue table 31 via line 101 by terminator 118.

If type code 107 indicates an audio or graphics command, initiator 131 leaves lines 133–135 unchanged for both video channels, and enables audio/graphics memory 125 via control line 132. Address 109 which is used as a disc track address for video commands has a different use for audio commands. Address 109 indicates the location of data blocks in memory 125 which is a conventional random access memory (RAM) into which blocks of digitally coded compressed audio and graphics data are stored via line 56 by retrieval unit 55 which obtains this data from non-picture tracks on disc 52. Plug-in cartridge 15 which contains conventional non-volatile RAM is addressed via bus 130 as an extension of memory 125. The RAM in cartridge 15 contains digitized audio recordings of the player's names as spoken by the various actors that may use the player's names during the show. Line 16 indicates that cartridge 15 is an extension of memory 125. When memory 125 is read-enabled by initiator 131 via line 132, memory 125 treats the binary address on bus 130 as a memory address of the first byte of data which it outputs on bus 128 or 127 (shown separately for clarity) depending on whether the data is audio or graphics. If audio, the byte on bus 128 is used by audio mixer 129 which increments the address on bus 130 via line 161 to access as many bytes from memory 125 as are needed to form a continuous audio signal. Mixer 129 edits the data from memory 125 according to the values on lines 111–113 from the command in buffer 102. Mixer 129 is described in detail below.

The "trim" field 111 in buffer 102 indicates the amount of audio signal to be trimmed from the beginning of the audio recording by mixer 129 to achieve precise synchronization for the current combination of audio and video. Mixer 129 performs this trimming while the digitized audio is still in compressed form in memory 125. Although each block of digitized audio in memory 125 begins at an integral frame, i.e. at 1/30 second intervals, this resolution is too coarse for precise audio editing, especially where variable-length spoken words must be inserted into dialog. The trim value on line 111 therefore represents eighths of video frames, which is equivalent to tenths of 35 mm film frames or 1/240 second. Mixer 129 discards the amount of audio indicated by trim field 111 and stores the trimmed series of bytes into memory 120 via line 119. Memory 120 may be a continuation of conventional RAM 125 but is shown separately in FIG. 4 for clarity. Mixer 129 may also attenuate the digitized audio by reducing each byte by the attenuation factor on line 112 from buffer 102. The details of mixer 129 are discussed below in the section on digital mixing.

After mixer 129 stores the edited digitized audio bytes into memory 120 and subsequent commands perhaps have caused mixer 129 to add additional audio to the bytes in memory 120, circuit 124 moves blocks of audio data from memory 120 into fast-in slow-out register 19. Register 19 may be a conventional charge coupled device (CCD) which is filled with digitized audio via line 18 at a bit rate of about 12 MHz and readout at a sampling (byte) frequency of about 10–12 kHz. Register 19 may also be a conventional RAM which is readout at the 10–12 kHz rate.

If type code 107 indicates a graphics command, memory 125 passes a series of bytes via line 127 to graphics generator 126, which may be a conventional circuit such as used with video games and which generates video signals on line 146 corresponding to various shapes, alpha/numeric characters and lines for display on TV screen 27. The binary data on line 127 may consist of raster coordinates, color selection, selected character/shape, color of character, orientation, brightness, direction of motion, and speed. For embodiments in which animated cartoons substitute for camera-originated frames, graphics generator 126 may generate video frames containing cartoon images. The details of unit 126 are shown in FIG. 12 and are described below.

Duration field 114 consists of a binary number which specifies the length of the time interval the current command is to be active. This number represents frame counts in video commands and eighths of frames for audio commands. For video commands counter 117 is initialized via line 114 with the duration count from buffer 102. The end-of-frame signal on line 100 decrements counter 117 each 1/30 second. When zero is reached, counter 117 signals terminator switching unit 118 via line 116 to begin the termination sequence. For audio/graphics commands the duration field in buffer 102 is moved via line 114 to mixer 129 which is detailed below. When mixer 129 has counted down the duration value from line 114, mixer 129 signals terminator 118 via line 162.

When terminator 118 (detailed in FIG. 21) receives a signal on line 116 it begins the termination sequence specified by the finish code on line 115. Terminator 118 also voids the status code of the current command in cue table 31 via line 101 so that cueing unit 12 will not move the completed command again from cue table 31 and to indicate to dispatcher unit 35 that the cue table space may be reused.

If type signal 107 indicates a video command and 3-bit finish code 115 indicates "cut", terminator 118 signals video switch 142 via line 121 to switch off video signal 144 for the channel indicated on line 108. If finish code 115 indicates "face out", terminator 118 signals fader 148 via line 122 to gradually reduce the amplitude of the picture component of the composite video signal on line 141 and then switch it off in circuit 142 (after delay 540 in FIG. 21, of 2 seconds or so). If finish code 115 indicates "repeat", lines 121 and 122 remain unchanged, but the track address on bus 139 is reinitialized to the buffer 102 value on bus 109, and counter 117 is reinitialized with the duration value on line 114. Thus the video frame sequence (or freeze frame if the duration is one) is restarted from the initial frame, except that the start signal on line 106 is not reprocessed. If finish code 115 indicates "next", the next sequential cue command in cue table 31 is loaded into buffer 102 via line 103 and given "immediate" status on line 104. The status of the command just terminated is set in cue table 31 by terminator 118 via line 101 to a "defer" status.

If type code 107 indicates an audio/graphics command, video control lines 121 and 122 remain unchanged. A "cut" signal on line 115 tells mixer 129 to stop editing digitized audio from memory 125. A "fade out" tells mixer 129 to gradually attenuate the edited audio in memory 120 just as if the attenuation value 112 were decreasing. "Repeat" and "next" are processed the same for audio/graphics commands as for video.

DESCRIPTION OF THE CARTOON GRAPHICS GENERATOR

Referring to FIG. 12, an alternative embodiment is shown in which the branching movie is an animated cartoon digitally generated by graphics generator 126 (detailed in FIG. 17) from compressed digitized data which may be read along with digitized audio from videodisc 52 and/or from other mass-storage devices such as magnetic bubble memory 173. A simple cartoon frame may be coded with fewer than 8K bits using string coding or line-length lists (assuming two colors and noninterlaced 240×256 pixels per frame) which is less than 5% of the bits that can be stored in one disc track, i.e. in 1/20 of the storage space required for one interlaced frame of camera-originated video. Less than 3K bits are required for a simple cartoon frame if a catalog of 8×8 dot matrixes is used.

Compression of the cartoon data makes it possible to store dozens of hours of different cartoon frames in compressed form on a videodisc along with digitized audio and the control commands which tie together the audio and cartoon frames into a branching movie. This animated cartoon embodiment may be preferred for economy reasons, especially for branching movies written for children.

As described above, dispatcher 35 controls the course of the movie and stores cue commands into cue table 31. Cueing unit 12 executes the cue commands at the times specified therein by conveying to cartoon generator 126 via line 127, blocks of compressed binary-coded data previously stored into memory 125 by retrieval unit 55 and used by generator 126 to generate one or more cartoon frames.

Circuitry for reading standard video, blanking, burst and sync from disc 52 is not required in this embodiment because the video signal is generated on line 146 (FIG. 4) by generator 126. The information read by conventional tracking circuit 58 and retrieval unit 55 may consist entirely of compressed digitized data from which video, audio, prompting text, and other signals are generated.

The data compression method herein described for storing animated cartoons, is a line-by-line string coding method in which much of the redundancy in each raster line is removed. A similar coding method is described in "Raster Scan Approaches to Computer Graphics" by Nicholas Negroponte, Computers and Graphics, Vol. 2, pp 179-193, 1977. Many data compression techniques known to the art may be used in lieu of string coding. For example a catalog of 2-dimentional dot matrices or "blobs" may be used as described in U.S. Pat. No. 4,103,287. Each dot matrix may include lines, corners, color wash, etc. from which each cartoon frame is constructed. Interframe coding may also be used.

String coding has the advantage of being able to compactly store frames with complex moving backgrounds. Unlike conventional video games with static or repetitive backgrounds that can be represented by a small catalog of dot matrices, action dramas in which the viewer is a participant require perspective, zoom, pan, tilt and other cinematic and animation techniques which may involve changes to most of the pixels (picture elements) from one frame to the next.

For portions of the cartoon movie in which a uniform color wash or held background is used, interframe coding and blob coding may be used. Algorithmically generated textured surfaces and other prior-art computer-graphics techniques may be used to further reduce the number of bits needed for each cartoon frame. Compressed key frames with automatic inbetweening may also be used.

Figure 17:
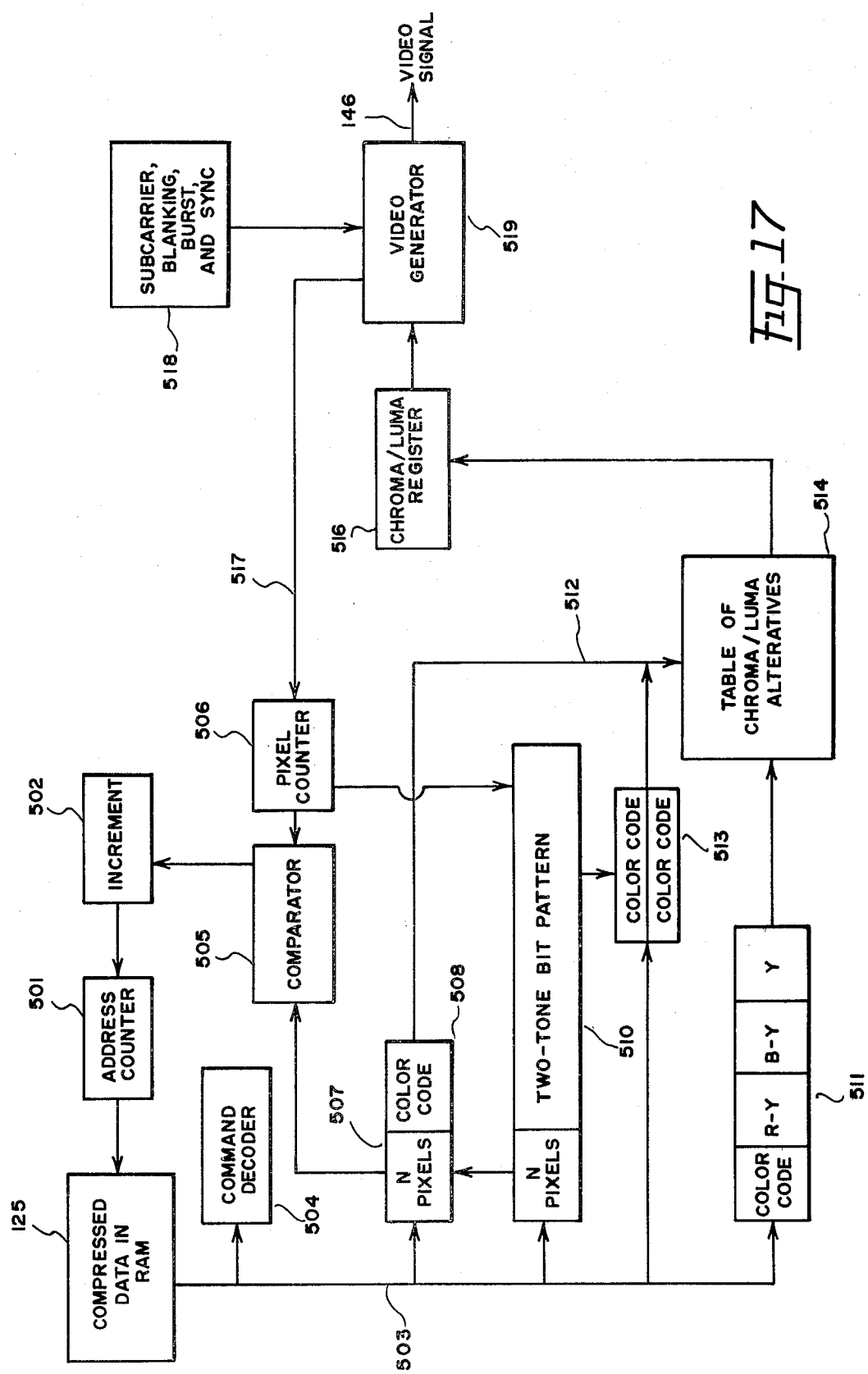
FIG. 17 is a detailed block diagram of graphics generator 126 for embodiments of the invention in which animated cartoons are digitally generated.
Figure 18:
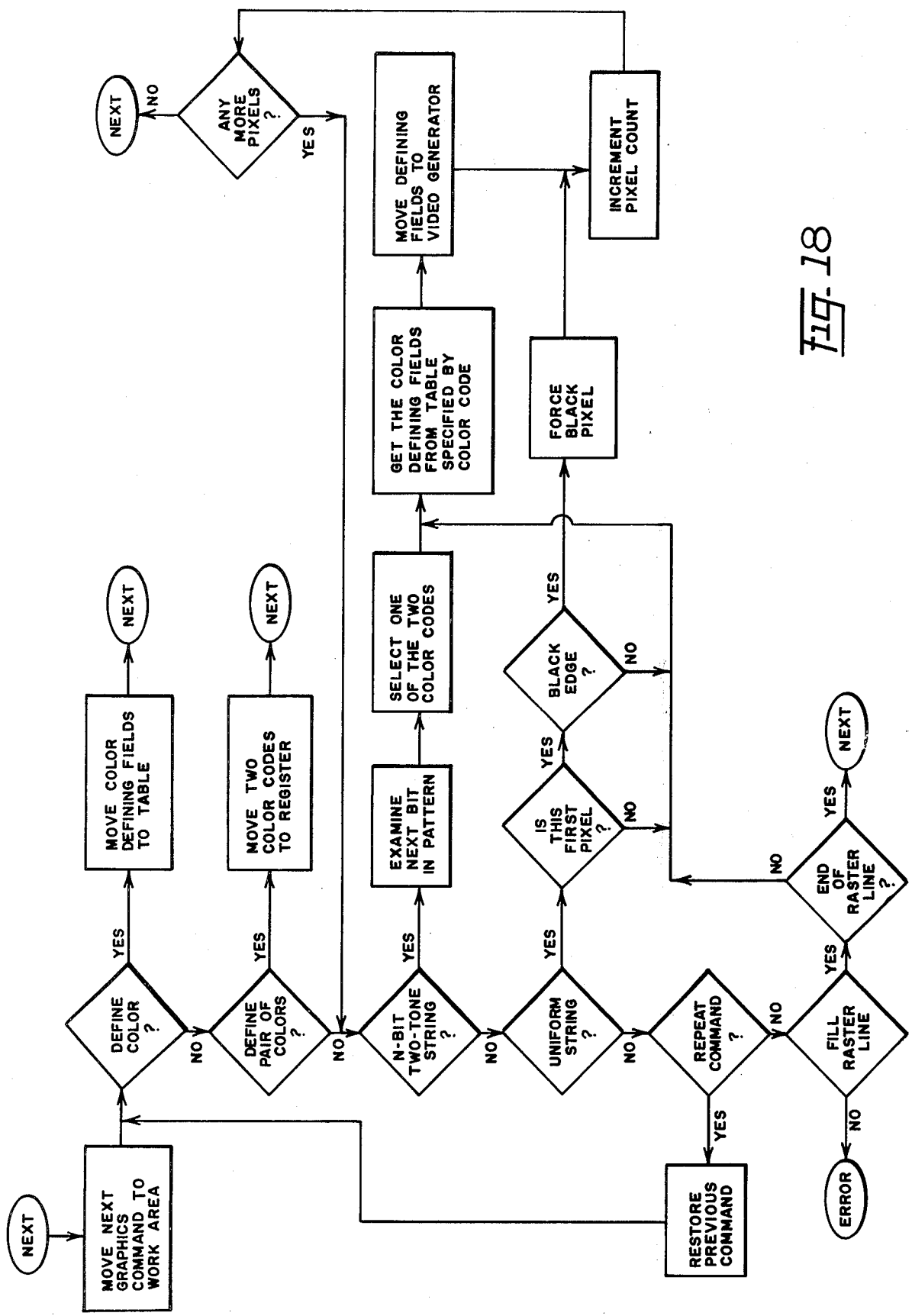
FIG. 18 is a process flowchart for one possible sequence in which animated cartoon graphics may be generated.

Referring to FIG. 17, the details of cartoon generator 126 are shown. Each field of video is defined by a sequence of graphics commands stored in RAM 125. These commands may include, in any sequence:
1. define color table entry.
2. start a new string using color code c and continue for n pixels.
3. same as #2 except the first pixel is black.
4. specify a pair of color codes.
5. use an n-bit pattern, each bit representing one pixel 6. fill next raster line with color c.
7. repeat previous command.

These commands are read in sequence onto bus 503 from memory 125. Before processing commands which cause video generator 519 to generate video signal 146, table 514 should be loaded with several color definitions, each definition specifying a specific hue, chrominance, and luminance. Each such color definition is stored in table 514 under a color code which is used in subsequent commands as a short way of specifying which color/brightness combination to display. In this example, table 514 may hold 16 definitions selected by the 4-bit color code on bus 512. When a color-defining command is read from memory 125 onto bus 503, command decoder 504 loads the color definition via register 511 into table 514. The definition consists of four binary-coded fields indicating the color code, luminance (Y), and chrominance vectors (R-Y) and (B-Y). Alternatively the chrominance/luminance alternatives may be fixed in the circuitry of video generator 519 or may be stored as a differential pulse code for rapid conversion by generator 519 to video signal 146. Other vectors besides (R-Y) and (B-Y) may be used (for example I and Q).

The first picture command for each field starts with the first pixel (picture element or dot) of raster line 22 or thereabouts and defines a variable-length portion of the line as a string of pixels. Command #2 consists of a command code (loaded into decoder 504 from bus 503), a binary number 507 indicating the number of pixels in the string, and color code 508 specifying via bus 512 which of the colors defined in table 514 is to be used. This selected color definition is loaded into register 516 where it remains for n pixels.

Conventional video generator 519 converts the binary-coded numbers in register 516 into one picture element of standard NTSC video signal 146 which includes blanking, sync, and burst from conventional circuit 518.

Command #3 works the same as Command #2 except the first one or two pixels of the string are forced to picture black to provide a cartoon outline between areas.

Commands #4 and #5 are used for fine detail in areas where color is uniform but finely detailed shading occurs (for example lines defining facial features or surface textures). Command #4 specifies a pair of color codes which are loaded into register 513 from bus 503. Command #5 contains a variable-length bit string 510. Each bit represents one pixel and specifies one of the two shades of colors coded in register 513. A 0-bit indicates one shade, a 1-bit indicates the other shade. In its simplest form, bit string 510 may represent black dots against a uniformly colored area (flesh tone for example).

Command #7 repeats the previous command for the next n pixels. This can be used in conjunction with Command #5 to define areas of textured background.

As video generator 519 processes the chroma/luma data in register 516, it increments via line 517 pixel counter 506 which points to the next bit in bit pattern 510. The binary-coded number 507, which indicates the number of pixels in each command, is compared by comparator 505 to the pixel count in counter 506. When a match occurs, the command has ended and address counter 501 is incremented to access the next command in memory 125.

Video generator 519, circuits 518, and a table 514 of fixed alternative colors and other circuitry may be combined on the same processor chip. Such a chip is manufactured by General Instrument Corp. for their GIMINI video games. This chip (called STIC for Standard Television Interface Chip) provides eight fixed color alternatives (including black and white) and is suitable for use in simple embodiments of the present invention.

DESCRIPTION OF THE DIGITAL MIXER

Figure 8:
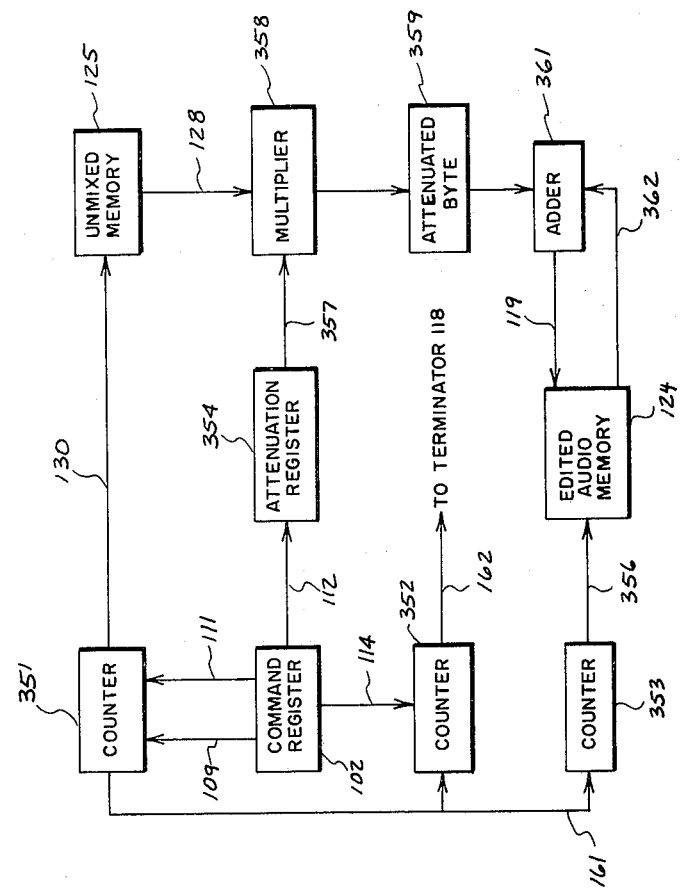
FIG. 8 shows a block diagram of one embodiment of a digitized audio mixer apparatus (block 129 in FIG. 4).

The detailed structure of one embodiment of digital audio mixer 129 is shown in FIG. 8. This circuit treats each digitized audio sample byte as a signed binary number. Each byte may resolve 256 amplitude levels and may use various prior-art encoding methods such as linear PCM (pulse-code modulation), log PCM, differential PCM, delta differential PCM, and others.

Binary data compression may be used for storing digitized audio in memory 125 and 120 so that the cost of storing all possible audio sequences at each branch point in the movie does not become excessive. Prior-art data compression may also be used on disc 52. An effective 10 kHz sampling rate can be achieved without recording a separate 8-bit byte for each sample by using differential PCM which specifies each incremental change from the previous sample. Expansion of this compressed data may be done by data moving circuit 124 so that the reconstructed audio in register 19 has an effective 10 kHz sampling rate.

Referring to FIG. 8, the address field and the trim field of the cue command in register 102 are moved via lines 109 and 111 respectively to counter 351 which addresses via line 130 the first byte of the unmixed audio in memory 125. The block address on line 109 specifies the high-order bits in counter 351, the trim bits on line 111 specify lower-order bits in counter 351, and the low-order bits of counter 351 are initialized to zero, so that the whole address in counter 351 represents the beginning of a 1/240 second interval of digitized audio.

The number of 1/240 second intervals to be edited is specified in the duration field of the cue command which initializes counter 352 via line 113. The attenuation field of the cue command is moved via line 112 to register 354. Counter 353 is initialized to the first byte of memory 120.

The byte of digitized audio addressed in memory 125 is moved via line 128 to multiplier 358 as a signed number. The attenuation value in register 354 is multiplied by the byte on line 128 by multiplier circuit 358 and the product is stored in register 359. If no attenuation is specified in register 354 the byte in register 359 is the same as the byte on line 128.

Counter 353 addresses a byte of digitized audio in memory 120 which is moved via line 362, added by adder 361 to the byte from register 359 and the sum is stored into the same byte location in memory 120 via line 119. The byte on line 362 may represent digitized audio specified by a previous cue command or may be zero if a new time interval block of audio is being edited.

Adder 361 may use fixed point addition, floating point addition, or a cumulative differential form of summing appropriate for differential PCM encoded data.

After each byte has been mixed, counter 351 is incremented to the next sample byte in memory 125, counter 353 is incremented via line 161 to the next edited byte in memory 120 and the byte count in counter 352 is decremented by one. When counter 352 reaches zero, the audio mixing stops and a termination signal is sent via line 162 to terminator 118.

DESCRIPTION OF METHOD FOR CUE COMMAND CONSTRUCTION

Whenever a series of video frames are used for alternative audio portions or for several successive audio portions, it is necessary to use a different selection of video frames for each audio portion to maintain lip sync. The series of cue commands which tells the apparatus which frames to use with which audio portion is read from the videodisc on which these cue command schedules were recorded. Prior to making the master recording the cue schedules should be programmed and debugged for every possible story line. Although this programming and debugging involves considerable human decision making by skilled film editors, constructing the cue command schedules to synchronize lip movements may use an automatic electronic process.

In the present invention, a method is used for automatically constructing cue command schedules for synchronizing multiple streams of speech with a common set of video frames. The present method may also be used with animated cartoons.

This method for constructing the cue command schedules includes processing the audio recording through an electronic phonetic event analyzer (such as that described in U.S. Pat. No. 3,943,295 or other similar devices) which produces a sequence of phonetic event data. This data is reduced to a small number of classes of phonemes which correlate with visibly different lip positions, including:
silence
phonemes /o/ and /w/
phonemes /sh/, /zh/, and /ch/
phonemes /b/, /m/, /p/, /f/, and /v/
all other phonemes.
From this phonetic data is recorded (in sync with the audio recording) a control track containing lip-position tags in the form of digital codes which indicate the phonetic class for each frame. If the recording is on video tape or disc, the lip-position tags may be recorded in the vertical blanking interval.

The purpose of these tags is not to faithfully characterize all the subtle lip, facial and head movements of the speaker, but rather to distinguish the least number of lip and facial positions that will pass for realistic by the average viewer.

Meanwhile, the film or video recording of the actor's face should be similarly tagged with control codes indicating the actor's lip positions for each frame. The words which the actor speaks are not heard by the viewer and are used only for phoneme analysis. The words need not be from the script, but may be chosen to exercise the actor's lips through the basic positions that are needed to synchronize with the phonetic classes in the multiple audio recordings.

After the lip-position tags have been added to both the picture recording and the dialog recordings, and these have been programmed to relate each picture sequence with the multiple dialogs, the picture recording tags are collated with each dialog to produce a cue command schedule for each such picture/dialog combination. The corresponding lip-position tags are electronically alligned so that closed lips in the picture match voice sounds requiring closed lips. The intervening time intervals between successive tags are filled by selecting video frames at approximately equally spaced intervals between successive tags for each audio portion. The same selection process is repeated for each audio portion. Each selection of frames is recorded in a schedule of cue commands which include frame identification codes. After a schedule has been created for all video/audio combinations, the frames not called for in any schedule are discarded. The same frames should be used in as many schedules as possible to minimize the total number of frames in the final videodisc recording.

Those skilled in the art will appreciate that precise sync voice dubbing involves more than just synchronizing open and closed lips. It is also desirable to synchronize facial expressions, gestures, tone of voice, and head positions, as well as lip positions. However such fine distinctions may be expensive to program and edit. Therefore multiple-audio lip sync may be restricted for use only when necessary (e.g. for insertion of player's names). In many cases only the most basic distinctions between lip positions will be needed.

DESCRIPTION OF THE HAND-HELD UNIT

Referring to FIG. 13, control unit 41 is shown which is used by each player to choose among options and alternatives presented at branch points in the movie. These alternatives may be presented to the player by various means including signal lamps such as lamp 43 and/or by menus of prompting messages such as the "YES" option 173 displayed on panel 174 which may include a liquid crystal device, light-emitting diodes, miniature cathode ray tube or other such display. Each option 173 may be associated with a juxtaposed push button 42 or proximity-sensing pad, and may represent words or phrases which the player may speak into microphone 40 and be understood by unit 38. If screen 27 is a touch screen, a player may "point" to an actor or a prompting message by touching the corresponding part of screen 27.

The signals from buttons 42 and microphone 40 may be sent to microcomputer 50 via cable 46 in FIG. 2 or via wireless communication link 172 to transceiver 171 in FIG. 12. Various means for link 172 may be used such as ultrasonic or electromagnetic radiation including conventional low-power radio. Voice signals received by transceiver 171 from microphone 40 are sent to voice recognition unit 38 via line 39 in FIG. 12. Signals from push buttons 42 are sent via line 44 to dispatcher unit 35 which selects alternative story commands as described above. Dispatcher 35 may send a signal to lamp 43 via line 66 and transceiver 171. Cueing unit 12 may send textual data via line 177 and transceiver 171 to display panel 174 in each player's unit 41. This textual data may be stored in random-access memory 125 or cartridge 15 until the time specified in a cue command. At the time scheduled by dispatcher 35, cueing unit 12 sends the data specified by address 109 from memory 125 via line 177 and transceiver 171 to the player's hand-held unit 41 or 45 to elicit a response from the player specified by a header byte in the data in memory 125. Control unit 41 may be combined with voice recognition unit 38 or other portions of the apparatus if desired. When used as a wireless hand-held unit, control unit 41 includes a transceiver (not shown) which communicates with transceiver 17.

DESCRIPTION OF THE CARTRIDGE

Plug-in cartridge 15, shown in FIG. 4 as an extension of memory 125, may be a non-volatile memory housed in a protective plastic case, for storing digitized audio recordings of the names of the various players as spoken by the various actors on the videodisc. Although it would be possible to store the entire catalog of common names and nicknames on videodisc 52 purchased by the players, for economy reasons the catalog of names may be stored on a second videodisc which is used by the retailer with a customizing micro-computer. The retail clerk gets a list of the player's names from the customer. The clerk keys these names into a keyboard connected to the customizing computer which reads the selected recordings from the retailer's videodisc and stores them into the cartridge. The customer buys this customized cartridge 15 with videodisc 52 as a set. Cartridge 15 should also contain digital address information which permits microcomputer 50 to find and confirm the control information on videodisc 52. This information could be different for each videodisc publication so that players would not inadvertently use the movie X voice cartridge with the videodisc for movie Y.

Accompanying each block of digitized audio may be several schedules of cue commands which identify the video frame sequence which synchronizes with each instance of the spoken name in the digitized audio. Each instance of the player's name may require different video frames, hence a separate schedule may be required for each instance. A schedule of video cue commands is not required for non-synchronized instances of name insertion, i.e. when the actor's lips are not visible or are out of focus.

OTHER APPLICATIONS

There are other uses to which this invention may be put besides participatory amusements. The apparatus and methods herein disclosed for synchronizing voice audio with moving lips may be used in communication systems where the channel capacity is too limited for transmitting a synchronized picture (for example using voice grade telephone lines). The picture of a synchronized talking head may be generated in the receiving unit from general-purpose video frames stored locally on an attached videodisc or other mass storage device. Only the audio and cue commands would be transmitted via the communications channel. Such a system could be used for educational lectures or news reports which change hourly or daily, but which do not have a sufficiently large audience for video broadcasts or cable transmission. The words would change, but the face(s) doing the talking could be the same standard face in each session.

The invention may be used for interactive devices which present a friendly talking face (an animated cartoon) for interaction with unskilled users. Such devices may be used in talking vending machines which play various recorded messages accompanied by a TV screen image of the digitally-generated talking face which is lip-synced with the sound as herein described.

The invention may be used for interactive conversations using videodisc recordings of famous people (either living or historical figures performed by actors). Such a conversation may be done interactively by each user who selects only those topics in which he is interested. Most of the audio on such a disc would be ignored by any one user, because it falls outside of his/her area of interest. To accompany this unused audio with unused video would be wasteful of disc space which could otherwise be used for storing more compressed audio. But if the video frames are pre-synchronized with multiple blocks of audio as herein disclosed, many hours of conversation can be recorded on one disc. Each user may find several hours of conversation to his/her liking, and may treat the famous person as a personal acquaintance who can be consulted on specific topics whenever the user wishes. It may be desirable to attach to dispatcher unit 35 an alphanumeric keyboard for entering keywords which define the viewer's area of interest. Retrieval unit 55 may use conventional data retrieval methods for locating the appropriate data on disc 52. This data may include story commands associated with the entered keywords.

In the case of conversations with living people, it is likely that the famous person whose voice and face are the subject of the recording, will want to impose a time limit on at least some of the audio so that messages of temporary significance will become inoperative after a preprogrammed time limit. Alternatively, the videodisc recording itself can contain an expiration date which retrieval unit 55 respects, so that the recorded material may be updated through sale of new discs.

EQUIVALENT EMBODIMENTS

Although I have described the preferred embodiments of my invention with a certain degree of particularity, it is understood that the present disclosure has been made only by way of example and that equivalent embodiments and numerous changes in the details of the design and the arrangement of components may be made without departing from the spirit and the scope of my invention.

Although the optically readable videodisc is preferred for use with the present invention, equivalent devices for storing video and audio in randomly accessible form may be substituted, such as drums, discs, cylinders, belts, etc. These may be optically, mechanically, electrically or magnetically read, either by a fixed or moving read head. A read head or a stylus using variable capacitance sensing may also be used. Solid state mass storage devices such as bubble memories, charge-coupled devices, and electron-beam written memory may also be used as equivalents of the videodisc.

It is contemplated that equivalent embodiments and arrangements may be constructed using discrete components or separate components such as gates and shift registers, or using equivalent integrated circuits, microcode, mask-programmed or electron-beam programmed microprocessors, or microprocessors which execute separately-stored programs to perform equivalent functions. Many other circuit variants and modifications may be made without departing from the spirit or essence of this invention. For clarity of presentation the preferred embodiments herein disclosed use separate components so that the interconnections between the components are shown explicitly in the drawings, and so that the cause and effect interrelationships are plainly set forth. It should be understood, however, that the annexed claims cover both separate-component embodiments and equivalent integrated-circuit embodiments including those using programmed microprocessors. Coding microprocessor firmware or programs to perform functions equivalent to those performed by separate-component circuitry is a coding activity well known to those skilled in the art.

It is further contemplated that other alterations, modifications adaptations and applications of the present invention may also become apparent to those skilled in the arts to which the invention is addressed after having read the foregoing disclosure. Accordingly, it is intended that the appended claims be interpreted as covering all such other embodiments, alterations, modifications, adaptations and applications as fall within the spirit and scope of the invention.

I claim the following:

1. An apparatus for simulating a voice conversation between a human operator of the apparatus and a previously recorded sound movie, the apparatus comprising:

means for controlling presentation of a first portion of said sound movie which is linked to a plurality of second portions thereof, the first portion including voice sounds to elicit from an operator of the apparatus a spoken response corresponding to one second portion in said plurality of second portions thereof; and means for analyzing said spoken response and determining therefrom which second portion of said sound movie corresponds to said spoken response, said controlling means further controlling presentation of the second portion of said sound movie which corresponds to said spoken response and which includes voice sounds responsive to the spoken response, thereby simulating a voice conversation between the movie and the operator.

2. The apparatus of claim 1, further comprising:

means for displaying a plurality of alternative responses for speaking by said operator and which correspond to said second portions of the sound movie, thereby prompting the operator to make a spoken response which said analyzing means distinguishes from other alternative responses in said displayed plurality.

3. An apparatus for simulating a voice conversation between a human operator of the apparatus and a sound movie, the apparatus comprising:

means for controlling presentation of scenes in said sound movie, a first scene therein being linked to a plurality of second scenes therein, the first scene including voice sounds to elicit from the operator a spoken response corresponding to one second scene in said plurality thereof;

means for analyzing said spoken response and determining therefrom which second scene in said sound movie corresponds to said spoken response; and means for scheduling for a point in time a second scene in said sound movie which corresponds to said spoken response and which includes voice sounds responsive to said spoken response, said controlling means further controlling presentation of said scheduled second scene at said point in time, thereby simulating a voice conversation between the movie and the operator.

4. The apparatus of claim 3, wherein each scene in said sound movie comprises video portions and audio portions, the apparatus further comprising means for selecting from a plurality of alternative audio portions one selected audio portion which includes said voice sounds responsive to the operator's spoken response, said scheduling means further scheduling said selected audio portion for a point in time in synchronism with one video portion, thereby synchronizing presentation of said one video portion with one of said plurality of alternative audio portions depending on the operator's spoken response.

5. The apparatus of claim 3, wherein a scene in said sound movie comprises video portions and alternative audio portions which include alternative spoken names, the apparatus further comprising:

means for selecting from a plurality of alternative audio portions one selected audio portion which includes the name of said operator, said scheduling means further scheduling said selected audio portion for a point in time in synchronism with one video portion, thereby synchronizing presentation of said one video portion with said operator's name.

6. An apparatus for simulating a voice conversation between a human operator of the apparatus and a sound movie, the apparatus comprising:

means for controlling presentation of scenes in said sound movie in accordance with a branching data structure of digital pointers which specify alternative sequences of said scenes, a portion of said data structure linking a first scene to a plurality of second scenes, the first scene eliciting from the operator a spoken response which corresponds to one digital pointer in said data structure portion; and means for analyzing said spoken response and determining therefrom which one digital pointer in said data structure portion corresponds to said spoken response, said controlling means further controlling presentation of the second scene linked to said first scene by said one digital pointer, the second scene including voice sounds responsive to said spoken response, thereby simulating a voice conversation between the movie and the operator.

7. The apparatus of claim 6, further comprising disc-shaped record carrier means storing said branching data structure.

8. An apparatus for simulating a voice conversation between a human operator of the apparatus and a sound movie, the apparatus comprising:

means for generating an audio signal of a voice speaking a plurality of words to elicit from a human operator a spoken response;

means for processing a video signal for presentation with said audio signal as a sound movie which includes an image of a speaking person;

means for analyzing said spoken response to determine which one word in said plurality of words most closely resembles a portion of said spoken response; and means for selecting from a plurality of recorded voice sounds a selected voice sound corresponding to said one word, said generating means further generating an audio signal which includes said selected voice sound for presentation with an image of said speaking person.

9. An apparatus for simulating a voice conversation between a human operator of the apparatus and an animated cartoon sound movie, the apparatus comprising:

means for generating an audio signal including voice sounds which communicate to the operator of the apparatus a plurality of alternative voice sounds to speak in response;

means for generating a video signal including animated cartoon images of a talking face, wherein said voice sounds and said talking face comprise scenes in said cartoon movie;

means for controlling presentation of a first scene in said cartoon movie which is linked to a plurality of second scenes therein, each second scene corresponding to one voice sound in a plurality of alternative voice sounds communicated in said first scene; and means for analyzing a spoken response from said operator and determining therefrom which selected voice sound in said first scene corresponds to said spoken response, said controlling means further controlling presentation of the second scene in said cartoon movie which corresponds to said selected voice sound and which includes voice sounds responsive to the selected voice sound, thereby simulating a voice conversation between the cartoon movie and the operator.

10. An apparatus for simulating a conversation between a human operator of the apparatus and a previously recorded sound movie, the apparatus comprising:

means for controlling presentation of scenes in said sound movie, a first scene therein including a talking face and corresponding voice sounds which communicate to said operator a plurality of alternative verbal responses which correspond to alternative second scenes in said sound movie;

means for receiving from said operator a response signal which corresponds to a selected verbal response in said communicated plurality thereof; and means for scheduling for a point in time a second scene in said sound movie which corresponds to said response signal and which includes a talking face and corresponding voice sounds responsive to said selected verbal response;

said controlling means further controlling presentation of said scheduled second scene at said point in time, thereby simulating a conversation between the movie and the operator.

11. The apparatus of claim 10, further comprising means displaying said plurality of alternative verbal responses.

12. The apparatus of claim 11, further comprising a plurality of finger activatable means each juxtaposed with one displayed verbal response in said plurality thereof.

13. An apparatus for simulating a conversation between a human operator of the apparatus and a previously recorded sound movie, the apparatus comprising:

means for controlling presentation of scenes in said sound movie which include a talking face and corresponding voice sounds, wherein a first scene is linked to a plurality of alternative second scenes;

means for communicating to said operator a plurality of alternative verbal responses to said first scene which correspond to alternative second scenes in said sound movie;

means for receiving from said operator a response signal which corresponds to a selected verbal response in said communicated plurality thereof; and means for scheduling for a point in time a second scene in said sound movie which corresponds to said response signal and which includes a talking face and corresponding voice sounds responsive to said selected verbal response;

said controlling means further controlling presentation of said scheduled second scene at said point in time, thereby simulating a conversation between the movie and the operator.

14. The apparatus of claim 13, wherein a scene in said sound movie comprises video portions and alternative audio portions which include alternative spoken names, the apparatus further comprising:

means for selecting from a plurality of alternative audio portions one selected audio portion which includes the name of said operator in the voice of said talking face;

said scheduling means further scheduling said selected audio portion for a point in time in synchronism with one video portion, thereby synchronizing presentation of said one video portion with said operator's name in the voice of said talking face.

15. The apparatus of claim 13, wherein each scene in said sound movie comprises video portions and audio portions, the apparatus further comprising:

means for selecting from a plurality of alternative audio portions one selected audio portion which corresponds to said response signal;

said scheduling means further scheduling said selected audio portion for a point in time in synchronism with one video portion, thereby synchronizing presentation of said one video portion with one of said plurality of alternative audio portions depending on the operator's response.

16. The apparatus of claim 13, further comprising:

means for storing a branching data structure of digital pointers which specify alternative sequences of said scenes, wherein said scheduling means schedules said second scene in accordance with the digital pointer in said data structure which corresponds to said response signal.

17. The apparatus of claim 13, wherein each of said alternative second scenes includes an action by a screen actor which is specified by the corresponding verbal response, said scheduling means further scheduling a second scene which includes an action by said screen actor which is specified by said response signal, thereby simulating control by said operator over the actions of the screen actor.

18. An apparatus for simulating a voice conversation between a human operator of the apparatus and a sound movie, the apparatus comprising:

means for controlling presentation of scenes in said sound movie, a first scene therein being linked to a plurality of second scenes therein;

means for analyzing a vocal expression from said operator and determining therefrom which second scene in said sound movie corresponds to said vocal expression; and means for scheduling for a point in time a second scene in said sound movie which corresponds to said vocal expression and which includes voice sounds responsive to said vocal expression, said controlling means further controlling presentation of said scheduled second scene at said point in time, thereby simulating a voice conversation between the movie and the operator.

19. An apparatus for simulating a conversation between a human operator of the apparatus and a previously recorded sound movie, the apparatus comprising:

means for controlling presentation of a first scene in a sound movie linked to a plurality of second scenes therein, the first scene including images of a talking person and corresponding voice sounds to elicit from said operator a spoken response corresponding to one second scene in said plurality thereof; and means for analyzing said spoken response and determining therefrom which selected second scene in said sound movie corresponds to said spoken response, the selected scene including an image of said talking person performing an action in accordance with said spoken response;

said controlling means further controlling presentation of said selected second scene, thereby simulating control by said operator over an action performed by the talking person.

20. An apparatus for simulating a conversation between a human operator of the apparatus and a previously recorded sound movie, the apparatus comprising:

means for controlling presentation of scenes in said sound movie, a first scene therein being linked to a plurality of second scenes therein;

means for communicating to said operator a plurality of alternative verbal responses to said first scene which correspond to alternative second scenes in said sound movie;

means for analyzing a verbal response from said operator and determining therefrom which selected second scene in said sound movie corresponds to said verbal response, the selected scene including an image of a talking person performing an action in accordance with said verbal response;

said controlling means further controlling presentation of said selected second scene, thereby simulating verbal control by the operator over an action performed by the talking person.

21. An apparatus for simulating a conversation between a human operator of the apparatus and a previously recorded sound movie, the apparatus comprising:

means for controlling presentation of scenes in said sound movie, a first scene therein including a talking person having moving lips and corresponding voice;

means for selecting from a plurality of alternative voice recordings one selected voice recording which includes the name of said operator in the voice of said talking person; and means for scheduling presentation of said selected voice recording for a point in time in synchronism with the moving lips of said talking person, said controlling means further controlling presentation of said scheduled voice recording at said point in time, thereby simulating a personalized conversation between the movie and the operator.

22. The apparatus of claim 21, further comprising means storing said plurality of alternative voice recordings.

23. An apparatus for simulating a conversation between a human operator of the apparatus and an animated cartoon sound movie, the apparatus comprising:

means for controlling presentation of scenes in said movie which include cartoon representations of a talking face with synchronized voice sound, wherein a first scene is linked to a plurality of alternative second scenes;

means for communicating to said operator a plurality of alternative verbal responses to said first scene which correspond to alternative second scenes in said movie;

means for receiving from said operator a response signal which corresponds to a selected verbal response in said communicated plurality thereof; and means for scheduling for a point in time a second scene in said cartoon movie which corresponds to said response signal and which includes said talking cartoon face and corresponding voice sounds responsive to said selected verbal response;

said controlling means further controlling presentation of said scheduled second scene at said point in time, thereby simulating a conversation between the cartoon movie and the operator.

24. An apparatus for simulating a voice conversation between a human operator of the apparatus and an animated cartoon sound movie, the apparatus comprising:

storage means for storing a plurality of portions of digitally coded data including portions of graphics data describing picture elements and the positions thereof in a plurality of cartoon pictures, and for storing digitized audio data for presentation as sound portions with the cartoon pictures, and for storing control data specifying ordered pluralities of portions of said graphics data and corresponding audio data for presentation as an animated cartoon sound movie, wherein said control data specifies a first portion of said graphics and audio data and a plurality of alternative second portions of said graphics and audio data;

means for controlling presentation of a first portion of said animated cartoon sound movie from said first portion of graphics and audio data including voice sounds which elicit from the operator a spoken response corresponding to one second portion of said graphics and audio data in said plurality of alternative portions thereof; and means for analyzing said spoken response and determining therefrom which second portion of graphics and audio data corresponds to said spoken response, said controlling means further controlling presentation of a subsequent portion of said animated cartoon sound movie from the second portion of graphics and audio data corresponding to said spoken response and which includes voice sounds responsive to the operator's spoken response, thereby simulating a voice conversation between the movie and the operator.

25. The apparatus of claim 24, further comprising:
means for constructing a schedule of commands, each command specifying a point in time for presentation of a cartoon picture in said movie.

26. The apparatus of claim 24, further comprising means for inserting a variable portion of digitized audio data into a sequence of said portions of digitized audio data, so as to modify the sound portions presented with said animated cartoon pictures.

27. The apparatus of claim 24, wherein said animated cartoon movie includes a cartoon representation of the face of a talking person and said digitized audio data includes a representation of voice sounds corresponding to the moving lips of said talking person, the apparatus further comprising means for synchronizing a cartoon picture of said face with a portion of said audio data so as to synchronize said moving lips with said voice sound.

28. An apparatus for simulating a conversation between a human operator of the apparatus and a previously recorded sound movie, the apparatus comprising:

means for controlling presentation of scenes in said sound movie, a first scene therein including a talking face and corresponding voice sounds which communicate to said operator a plurality of alternative verbal responses which correspond to alternative second scenes in said sound movie;

means for generating a plurality of prompting messages, each message corresponding to one verbal response in said plurality thereof;

means for receiving from said operator a response signal which corresponds to a selected prompting message in said generated plurality thereof; and means for scheduling for a point in time a second scene in said sound movie which corresponds to said response signal and which includes a talking face and corresponding voice sounds responsive to said selected prompting message;

said controlling means further controlling presentation of said scheduled second scene at said point in time, thereby simulating a conversation between the movie and the operator.

29. The apparatus of claim 28, wherein a scene in said sound movie comprises video portions and alternative audio portions which include alernative spoken names, the apparatus further comprising:

means for selecting from a plurality of alternative audio portions one selected audio portion which includes the name of said operator in the voice of said talking face;

said scheduling means further scheduling said selected audio portion for a point in time in synchronism with one video portion, thereby synchronizing presentation of said one video portion with said operator's name in the voice of said talking face.

30. The apparatus of claim 28, wherein a scene in said sound movie comprises video portions and alternative audio portions which include representations of voice sounds corresponding to the moving lips of said talking face, the apparatus further comprising:

means for selecting from a plurality of alternative audio portions one selected audio portion;

said scheduling means further scheduling said selected audio portion for a point in time in synchronism with one video portion, thereby synchronizing said moving lips with said voice sound.

31. A method of inserting an utterance into sound accompanying a movie comprising the steps of:

storing in a memory means a digitized audio recording of said utterance, scheduling a sequence of video frames comprising said motion picture, scheduling a first audio signal in synchronism with said video frames, scheduling said utterance recording to begin during one video frame in said sequence thereof, electronically trimming a beginning portion of predetermined duration from said utterance recording so as to shift with respect to time said utterance recording relative to said sequence of video frames, mixing said trimmed utterance recording with said first audio signal, thereby producing a second audio signal, presenting said sequence of video frames as a movie and said second audio signal as an accompanying sound in accordance with said schedules.

32. A method of simulating a voice conversation between a previously recorded sound movie and a human viewer of the movie, comprising the steps of:

storing a plurality of video frames, each having a video frame identifier;

storing a plurality of ordered schedules of said video frame identifiers, each schedule thereof being associated with one preestablished set of features characterizing human voice sounds;

linking said plurality of schedules with a branching data structure of digital pointers including branch points each of which point to a plurality of alternative schedules;

electronically recognizing a voice sound as most resembling one of said set of features, thereby indicating a selected set of features;

selectively retrieving from said plurality of schedules the schedule associated with said selected set of features;

retrieving from said plurality of video frames the video frames identified by said retrieved schedule in the sequence specified therein; and presenting said retrieved video frames as a movie.

33. A method of simulating a voice conversation between an animated cartoon sound movie and a human viewer of the movie, comprising the steps of:

storing a branching data structure which specifies alternative scene sequences in an animated cartoon movie, each scene sequence comprising a plurality of movie scenes;

presenting to said viewer a first scene of said cartoon movie specified by a first portion of said data structure, wherein a plurality of second portions of said data structure branch from said first portion thereof;

presenting in said first scene a plurality of alternative choices so as to elicit a spoken response from said viewer;

accepting from said viewer a spoken response corresponding to one choice in said plurality of alternative choices;

selecting from said plurality of second portions of said data structure one second portion thereof corresponding to said accepted spoken response; and presenting to said viewer a subsequent scene of said cartoon movie specified by said selected second portion of said data structure responsive to said viewer's spoken response, thereby simulating a conversation between the viewer and the animated cartoon movie.

34. A method of simulating a voice conversation between a previously recorded sound movie and a human participant who is watching the movie, comprising the steps of:

presenting a first scene in said movie linked to a plurality of second scenes therein, the first scene including a moving picture of a talking face and a voice sound expressing a plurality of prompting words to elicit a spoken response which resembles one of said prompting words, each said prompting word corresponding to a second scene in said plurality of second scenes;

comparing electronically said spoken response to said plurality of prompting words to determine which selected word in said plurality resembles said spoken response; and presenting the second scene corresponding to said selected word including said talking face and a voice sound, thereby simulating a voice conversation between the human and the movie.

35. A method of simulating a voice conversation between a previously recorded sound movie and a human participant who is watching the movie, comprising the steps of:

presenting a first scene in said movie linked to a plurality of second scenes therein, the first scene including a moving picture of a talking face and a voice sound expressing a plurality of prompting words to elicit a spoken response which resembles one of said prompting words, each said prompting word corresponding to a second scene in said plurality thereof and having a distinguishing phonetic feature;

analyzing said spoken response electronically to determine which distinguishing phonetic feature is present therein and thereby selecting a word in said plurality of prompting words which resembles said spoken response; and presenting the second scene corresponding to said selected word including said talking face and a voice sound, thereby simulating a voice conversation between the humand and the movie.

36. A method of simulating a voice conversation between a previously recorded sound movie and a human participant who is watching the movie, comprising the steps of:

displaying a first scene in said movie linked to a plurality of second scenes therein, the first and second scenes including a moving picture of a talking face;

presenting with said first scene a plurality of prompting words to elicit a spoken response corresponding to one of said prompting words, each prompting word corresponding to a second scene in said plurality thereof;

determining electronically which selected word in said plurality of prompting words corresponds to said spoken response; and displaying the second scene corresponding to said selected word including said talking face accompanied by voice sounds responsive to said selected word, thereby simulating a voice conversation between the human and the movie.

37. A method of simulating a voice conversation between a previously recorded sound movie and a human participant who is watching the movie, comprising the steps of:

displaying a first scene in said movie linked to a plurality of second scenes therein, the first and second scenes including a moving picture of a talking face;

presenting with said first scene a plurality of phonetically distinct voice sounds to elicit a spoken response corresponding to one of said voice sounds, each said voice sound corresponding to a second scene in said plurality of second scenes;

analyzing said spoken response electronically to determine which selected voice sound in said plurality corresponds to said spoken response; and displaying the second scene corresponding to said selected voice sound accompanied by further voice sounds which are responsive to said selected voice sound, thereby simulating a voice conversation between the human and the movie.

38. A method of simulating a voice conversation between a previously recorded sound movie and a human participant who is watching the movie, comprising the steps of:

displaying a first scene in said movie linked to a plurality of second scenes therein, the first scene including a moving picture of a talking face accompanied by voice sounds expressing a plurality of prompting words;

displaying said plurality of prompting words to elicit a spoken response which includes one of said prompting words, each said prompting word corresponding to a second scene in said plurality of second scenes;

analyzing said spoken response electronically to determine which selected word in said plurality of prompting words is included in said spoken response; and displaying the second scene corresponding to said selected word including said talking face accompanied by voice sounds responsive to said selected word, thereby simulating a voice conversation between the human and the movie.

39. A method of providing a human viewer of a motion picture story with simulated individualized participation therein, comprising the steps of:

displaying a first scene in said motion picture story linked to a plurality of second scenes therein, the first scene presenting a plurality of alternative choices corresponding to said second scenes;

presenting a plurality of prompting words, each word corresponding to a choice in said plurality of alternative choices and corresponding to a second scene in said plurality thereof to elicit a spoken response which includes one of the prompting words;

analyzing said spoken response electronically to determine which selected word in said plurality of prompting words is included in said spoken response; and displaying the second scene corresponding to said selected word, thereby simulating participation by said human in the motion picture story.

40. A method of simulating a voice conversation between a motion picture and a human viewer who is watching the motion picture, comprising the steps of:

displaying a first portion of said motion picture linked to a plurality of second portions thereof, the first portion including an image of a talking face;

presenting with said first portion a plurality of vocal expressions to elicit a spoken response corresponding to one of said vocal expressions, each said vocal expression corresponding to a second motion picture portion in said plurality thereof;

analyzing said spoken response electronically to determine which selected vocal expression in said plurality of vocal expressions corresponds to said spoken response; and displaying the second portion of said motion picture corresponding to said selected vocal expression, thereby simulating a voice conversation between the human viewer and the talking face in the motion picture.

41. A method of employing a standard television receiver and videodisc player to provide a human who is watching the screen of said television receiver with vocal participation in a branching movie presented thereon, comprising the steps of:

storing a plurality of ordered schedules of video frame addresses, each schedule thereof being associated with one preestablished set of phonetic features characterizing human voice sounds;

linking a first schedule in said plurality of schedules to a plurality of alternative second schedules therein with a branching data structure of digital pointers;

displaying on said screen the video frames specified by said first schedule to elicit a voice sound response;

determining electronically which of said sets of phonetic features resembles the phonetic features of said voice sound response, thereby indicating a selected set of phonetic features;

selectively retrieving from said plurality of second schedules the selected schedule associated with said selected set of phonetic features; and displaying on said screen the video frames specified by said selected schedule, thereby providing said human with vocal participation in the branching movie which includes said video frames.

42. A method of simulating a voice conversation between an animated cartoon motion picture and a human viewer of the picture, comprising the steps of:

storing a plurality of schedules of graphics data, each schedule specifying picture portions of an animated cartoon picture;

generating a first animated cartoon picture specified by a first said schedule linked to a plurality of second said schedules;

emitting with said first animated cartoon picture a plurality of alternative voice sounds to elicit a spoken response, each alternative voice sound being associated with a second schedule in said plurality thereof;

determining electronically which alternative voice sound in said plurality thereof resembles said spoken response, thereby determining which selected second schedule corresponds to said spoken response; and generating a second animated cartoon picture specified by said selected second schedule, thereby simulating a conversation between the human and the animated cartoon motion picture.

43. A method of simulating a voice conversation between an animated cartoon motion picture and a human viewer of the picture, comprising the steps of:

storing a plurality of schedules of graphics data, each schedule specifying picture portions of an animated cartoon picture;

generating a first animated cartoon picture specified by a first said schedule linked to a plurality of second said schedules;

presenting with said first animated cartoon picture a plurality of prompting words to elicit a spoken response correspnding to one of said prompting words, each prompting word being associated with a second schedule in said plurality thereof;

determining electronically which word in said plurality of prompting words corresponds to said spoken response, thereby determining which selected second schedule corresponds to said spoken response; and generating a second animated cartoon picture specified by said selected second schedule, thereby simulating a conversation between the human and the animated cartoon motion picture.

44. A method of simulating a voice conversation between an animated cartoon motion picture and a human viewer of the picture, comprising the steps of:

displaying a first animated cartoon picture linked to a plurality of second animated cartoon pictures, the first picture including a talking face accompanied by voice sounds;

presenting with said first animated cartoon picture a plurality of phonetically distinct verbal expressions to elicit a spoken response which resembles one of said verbal expressions, each verbal expression corresponding to a second animated cartoon picture in said plurality thereof;

analyzing said spoken response electronically to determine which selected verbal expression in said plurality of verbal expressions resembles said spoken response; and displaying the second animated cartoon picture corresponding to said selected verbal expression, thereby simulating a voice conversation between the human and the talking face in the animated cartoon motion picture.

45. A method of simulating a voice conversation between an animated cartoon motion picture and a human viewer of the picture, comprising the steps of:

displaying a first animated cartoon picture linked to a plurality of second animated cartoon pictures, the first picture including a talking face accompanied by voice sounds;

displaying a plurality of prompting words to elicit a spoken response corresponding to one of said prompting words, each prompting word corresponding to a second animated cartoon picture in said plurality thereof;

analyzing said spoken response electronically to determine which selected word in said plurality of prompting words corresponds to said spoken response; and displaying the second animated cartoon picture corresponding to said selected word, thereby simulating a voice conversation between the human and the talking face in the animated cartoon motion picture.

46. A method of simulating a voice conversation between an animated cartoon motion picture and a human viewer of the picture, comprising the steps of:

displaying a first animated cartoon picture of a talking face linked to a plurality of second animated cartoon pictures thereof;

generating voice sounds for a plurality of prompting words to elicit a spoken response corresponding to one of said prompting words, each prompting word corresponding to a second animated cartoon picture in said plurality thereof;

analyzing said spoken response electronically to determine which selected word in said plurality of prompting words corresponds to said spoken response; and displaying the second animated cartoon picture corresponding to said selected word, thereby simulating a voice conversation between the human and the talking face in the animated cartoon motion picture.

47. A method of providing a human viewer of an animated cartoon story with simulated individualized participation therein, comprising the steps of:

displaying a first animated cartoon picture in said story linked to a plurality of second animated cartoon pictures therein, the first picture presenting a plurality of alternative choices, each choice corresponding to a second cartoon picture in said plurality thereof;

presenting a plurality of prompting words, each word corresponding to a choice in said plurality of alternative choices and corresponding to a second cartoon picture in said plurality thereof to elicit a spoken response which includes one of the prompting words;

analyzing said spoken response electronically to determine which selected word in said plurality of prompting words is included in said spoken response; and displaying the second cartoon picture correspnnding to said selected word, thereby simulating participation by said human in the animated cartoon story.

48. A method of simulating a voice conversation between an animated cartoon motion picture and a human viewer of the picture, comprising the steps of:

displaying a first animated cartoon picture of a talking face linked to a plurality of second animated cartoon pictures thereof;

generating voice sounds expressing a plurality of prompting words, each prompting word corresponding to a second animated cartoon picture in said plurality thereof;

displaying said plurality of prompting words to elicit a spoken response which includes one of said prompting words;

analyzing said spoken response electronically to determine which selected word in said plurality of prompting words is included in said spoken response; and displaying the second animated cartoon picture corresponding to said selected word, thereby simulating a voice conversation between the human and the talking face in the animated cartoon motion picture.

49. A method of simulating a dialog between an animated cartoon motion picture and a human viewer of the picture, comprising the steps of:

storing a plurality of schedules of graphics data, wherein a first schedule of graphics data is linked to a plurality of second schedules of graphics data, each schedule specifying picture portions of an animated cartoon picture of a talking face;

generating a first animated cartoon picture specified by said first schedule of graphics data;

generating in synchronism with said first animated cartoon picture a plurality of voice sonds including prompting words, each prompting word corresponding to a second schedule in said plurality thereof;

displaying said prompting words as a plurality of human-readable messages to elicit a response signal corresponding to a selected prompting word;

generating a second animated cartoon picture specified by the second schedule in said plurality of schedules corresponding to said response signal; and generating in synchronism with said second animated cartoon picture a voice sound which corresponds to and is responsive to said selected prompting word, thereby simulating a dialog between the talking cartoon face and the human viewer.

* * * * *